(12) United States Patent
Mola

(10) Patent No.: US 12,306,757 B2
(45) Date of Patent: May 20, 2025

(54) RECORDING A CACHE COHERENCY PROTOCOL TRACE FOR USE WITH A SEPARATE MEMORY VALUE TRACE

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 17/921,063

(22) PCT Filed: Apr. 30, 2021

(86) PCT No.: PCT/US2021/030199
§ 371 (c)(1),
(2) Date: Oct. 24, 2022

(87) PCT Pub. No.: WO2021/225893
PCT Pub. Date: Nov. 11, 2021

(65) Prior Publication Data
US 2023/0176971 A1    Jun. 8, 2023

(30) Foreign Application Priority Data

May 5, 2020    (LU) .................................. LU101768

(51) Int. Cl.
*G06F 11/34*    (2006.01)
*G06F 12/0815*    (2016.01)

(52) U.S. Cl.
CPC ...... *G06F 12/0815* (2013.01); *G06F 11/3471* (2013.01); *G06F 2201/885* (2013.01);
(Continued)

(58) Field of Classification Search
CPC ......... G06F 11/3471; G06F 2212/1016; G06F 2201/885; G06F 11/3466; G06F 11/3476; G06F 11/3436
See application file for complete search history.

(56) References Cited

U.S. PATENT DOCUMENTS 8,051,247 B1    11/2011    Favor
8,370,576 B1    2/2013    Favor
(Continued)

OTHER PUBLICATIONS

Notice of Allowance mailed on Dec. 20, 2023, in U.S. Appl. No. 17/921,053, 13 pages.
(Continued)

*Primary Examiner* — Kamini B Patel
(74) *Attorney, Agent, or Firm* — Workman Nydegger

(57) ABSTRACT

A processor that performs cache-based tracing based on recording one or more cache coherency protocol (CCP) messages into a first trace. Based on detecting a memory access to a target memory address, the processor logs into the first trace information usable to obtain a memory value corresponding to the particular memory address from the memory snapshot(s) stored within the second trace. This includes logging the particular memory address, as well as CCP message(s) indicating at least of: (i) that none of a plurality of processing units possessed a first cache line within the cache that overlaps with the target memory address; (ii) that a first processing unit initiated a cache miss for the target memory address; or (iii) that the first processing unit obtained, from a second processing, a second cache line within the cache that overlaps with the target memory address.

20 Claims, 8 Drawing Sheets

(52) U.S. Cl.
CPC ............... *G06F 2212/1016* (2013.01); *G06F 2212/1052* (2013.01)

(56) References Cited

U.S. PATENT DOCUMENTS

| | | | |
|---|---|---|---|
| 8,370,609 | B1 | 2/2013 | Favor |
| 8,487,895 | B1 | 7/2013 | Brown |
| 9,195,593 | B1 | 11/2015 | Radovic |
| 9,432,298 | B1 | 8/2016 | Smith |
| 9,471,313 | B1 | 10/2016 | Busaba |
| 9,934,127 | B1 | 4/2018 | Mola et al. |
| 9,973,465 | B1 | 5/2018 | Linkous |
| 9,996,287 | B2 | 6/2018 | Dornemann |
| 10,089,230 | B1 | 10/2018 | Koker |
| 10,635,555 | B2 | 4/2020 | Grosser |
| 11,405,189 | B1 | 8/2022 | Bennison |
| 11,474,871 | B1 | 10/2022 | Mittal |
| 12,079,155 | B2 | 9/2024 | Ray |
| 2002/0073063 | A1 | 6/2002 | Faraj |
| 2014/0112339 | A1 | 4/2014 | Safranek et al. |
| 2016/0239431 | A1 | 8/2016 | Li |
| 2018/0060215 | A1* | 3/2018 | Mola ................. G06F 9/542 |
| 2018/0101483 | A1 | 4/2018 | Catthoor |
| 2018/0113806 | A1 | 4/2018 | Mola |
| 2018/0113809 | A1 | 4/2018 | Mola |
| 2018/0165199 | A1* | 6/2018 | Brandt ................. G06F 9/384 |
| 2019/0065339 | A1* | 2/2019 | Mola .................. G06F 11/3612 |
| 2019/0087305 | A1* | 3/2019 | Mola .................. G06F 11/3476 |
| 2019/0180407 | A1 | 6/2019 | Goossen et al. |
| 2019/0220403 | A1* | 7/2019 | Mola .................. G06F 12/084 |
| 2019/0258556 | A1* | 8/2019 | Mola .................. G06F 11/3466 |
| 2019/0266090 | A1* | 8/2019 | Mola .................. G06F 11/3476 |
| 2019/0286549 | A1* | 9/2019 | Mola .................. G06F 21/6218 |
| 2020/0026639 | A1* | 1/2020 | Mola .................. G06F 11/3636 |
| 2020/0349051 | A1* | 11/2020 | Mola .................. G06F 9/30098 |
| 2023/0169010 | A1 | 6/2023 | Mola |
| 2023/0176971 | A1* | 6/2023 | Mola .................. G06F 21/6245 711/141 |
| 2023/0342282 | A1* | 10/2023 | Mola .................. G06F 12/0875 |
| 2023/0350804 | A1* | 11/2023 | Mola .................. G06F 11/3636 |
| 2024/0095187 | A1* | 3/2024 | Mola .................. G06F 12/0895 |

OTHER PUBLICATIONS

Feldman, et al., "Igor: A System for Program Debugging via Reversible Execution", In Proceedings of ACM SIGPLAN and SIGOPS Workshop on Parallel and Distributed Debugging, Nov. 1, 1988., pp. 112-123.

"Search Report and Written Opinion Issued in Luxembourg Patent Application No. LU101767", Mailed Date: Feb. 26, 2021, 13 Pages.

"Search Report and Written Opinion Issued in Luxembourg Patent Application No. LU101768", Mailed Date : Feb. 10, 2021, 11 Pages.

"Search Report and Written Opinion Issued in Luxembourg Patent Application No. LU101769", Mailed Date: Feb. 5, 2021, 12 Pages.

"Search Report and Written Opinion Issued in Luxembourg Application No. LU101770", Mailed Date: Feb. 5, 2021, 12 Pages.

"International Search Report & Written Opinion issued in PCT Application No. PCT/US21/030199", Mailed Date: Aug. 27, 2021, 15 Pages.

"International Search Report & Written Opinion issued in PCT Application No. PCT/US21/030220", Mailed Date: Aug. 25, 2021, 16 Pages.

"International Search Report and Written Openion Issued in PCT Application No. PCT/US21/030222", Mailed Date : Oct. 8, 2021, 18 Pages.

"Invitation to Pay Additional Fees Issued in PCT Application No. PCT/US21/030222", Mailed Date: Aug. 12, 2021, 14 Pages.

"International Search Report and Written Opinion Issued in PCT Application No. PCT/US21/030552", Mailed Date: Feb. 24, 2022, 20 Pages.

Basu, et al., "Software Assisted Hardware Cache Coherence for Heterogeneous Processors", Proceedings of the Second International Symposium on Memory Systems, Oct. 3, 2016, pp. 279-288.

Kaushik, et al., "Designing Predictable Cache Coherence Protocols for Multi-Core Real-Time Systems", IEEE Transactions on Computers, vol. 70, Issue 12, Nov. 12, 2020, pp. 2098-2111.

Non-Final Office Action mailed on Apr. 15, 2024, in U.S. Appl. No. 17/921,067, 21 pages.

U.S. Appl. No. 17/921,053, filed May 4, 2021.
U.S. Appl. No. 17/921,048, filed Apr. 30, 2021.
U.S. Appl. No. 17/921,067, filed Apr. 30, 2021.
U.S. Appl. No. 18/895,877, filed Sep. 25, 2024.

Ciriani et al, "Combining Fragmentation and Encryption to Protect Privacy in Data Storage", ACM Transactions on Information and System Security, vol. 13, Issue No. 1, 2010, pp. 1-33.

Luo, et al, "Public Trace-and-Revoke Proxy Re-Encryption for Secure Data Shring in Clouds", IEEE Transactions on Information Forensics and Security, vol. 19, 2024, pp. 2919-2934.

Lyu, et al, "Directed Test Generation for Validation of Cache Coherence Protocols", IEEE Transactions on Computer-Aided Design of Integrated Circuits and Systems, vol. 38, Issue No. 1, 2019, pp. 163-176.

Notice of Allowance mailed on Sep. 17, 2024, in U.S. Appl. No. 17/921,067, 13 pages.

Zakharov et al, "Time-dependent differential privacy for enhanced data protection in synthetic transaction generation", Proceedings of the 2024 13th International Conference on Software and Computer Applications, 2024, pp. 112-117.

Dunlap, et al., "ReVirt: Enabling intrusion analysis through virtual-machine logging and replay," ACM SIGOPS Operating Systems Review 36.SI, 2002, pp. 211-224.

Lee, at al., "Design of flash-based DBMS: an in-page logging approach," Proceedings of the 2007 ACM SIGMOD international conference on Management of data, 2007, pp. 55-66.

Notice of Allowance mailed on Jun. 26, 2024, in U.S. Appl. No. 17/921,048, 12 pages.

Polyn, et al., "Category-specific cortical activity precedes retrieval during memory search" Science, vol. 310, Issue No. 5756, Dec. 23, 2005, pp. 1963-1966.

* cited by examiner

RECORDING A CACHE COHERENCY PROTOCOL TRACE FOR USE WITH A SEPARATE MEMORY VALUE TRACE

CROSS-REFERENCE TO RELATED APPLICATIONS

The present application is a U.S. National Stage of International Application No. PCT/US2021/030199, filed on Apr. 30, 2021, designating the United States and claiming the priority of Luxembourg Patent Application No. LU101768 filed with the Luxembourg Intellectual Property Office on May 5, 2020. All of the aforementioned applications are incorporated herein in their respective entireties by this reference.

TECHNICAL FIELD

The present disclosure relates to systems, methods, and devices that protect sensitive information when recording a replayable execution trace of a computing context.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause(s).

Developers have used a variety of approaches to identify undesired software behaviors, and to then identify the location(s) in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace can contain "bit-accurate" historic execution trace data, which enables the recorded portion(s) the traced execution context to be virtually "replayed" (e.g., via emulation) down to the granularity of individual instructions (e.g., machine code instructions, intermediate language code instructions, etc.). Thus, using "bit-accurate" trace data, diagnostic tools enable developers to reason about a recorded prior execution of subject context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Some techniques for recording execution traces operate based, at least in part, on a microprocessor (processor) logging into an execution trace at least a portion of influxes (i.e., cache misses) into the processor's cache during execution of an execution context by the processor. When compared to non-cache-based recording techniques such as software emulation, cache-based recording techniques present many opportunities to reduce recording overheads and/or to reduce the amount of data that is recorded into an execution trace. However, if the executing context reads sensitive memory values from memory, such as personally-identifiable information (PII), encryption keys, and the like, those sensitive memory values have the potential to become cache influxes, and thus conventional cache-based recording techniques may log those sensitive values into an execution trace. Thus, cache-based recording techniques present potential security concerns when tracing execution contexts that interact with memory storing sensitive data values.

BRIEF SUMMARY

At least some embodiments described herein alleviate the security concerns associated with cache-based recording techniques by separating an execution trace into two separate and distinct component traces. The component traces include a first component trace, recorded by a processor, that records at least a portion of cache coherency protocol (CCP) messages communicated between a plurality of processing units as those processing units perform memory access for an execution context. Notably, this first component trace lacks memory values associated with those memory accesses. The component traces also include a second component trace, recorded by a software operating environment, that records one or more snapshots of at least a portion of system memory. In embodiments, the first component trace contains sufficient information to be useful for profiling and/or debugging the execution context (such as to analyze processor cache use by the execution context), but the first trace lacks sufficient information to actually replay the recorded execution of the execution context. Instead, in embodiments, replay of the recorded execution of the execution context is accomplished by combining the information (e.g., CCP messages) contained in the first component trace with the information (e.g., memory snapshots) contained in the second component trace.

As will be appreciated in view of the disclosure herein, separating an execution trace into distinct component traces, in the manner described herein, facilitates data separation and the ability to store the component traces in different security domains, the ability to apply different data security policies to the component traces, the ability to apply different data protections to the component traces, etc. In embodiments, the second component trace (e.g., containing memory data) is stored in a more privileged security domain (e.g., as compared to a security domain in which the first component trace is stored), a more stringent data security policy is applied to the second component trace (e.g., as compared to a data security policy applied to the first component trace), and/or a higher level of data protection is applied to the second component trace (e.g., as compared to a data projection scheme applied to the first component trace). Thus, sensitive memory values (e.g., PII, encryption keys, etc.) are protected within the second component trace. At the same time, separating an execution trace into component traces, in the manner described herein, still provides many of the same opportunities as more conventional cache-based recording techniques for reducing recording overheads and/or for reducing the amount of data that is recorded into an execution trace.

Additionally, separating an execution trace into distinct component traces, in the manner described herein, results in reduced memory bandwidth use when compared to more conventional cache-based recording techniques. In particular, a processor that records a component trace comprising at least a portion of CCP messages communicated based on memory accesses pushes those CCP messages onto a memory bus and into an execution trace (e.g., in system memory or in durable storage). However, unlike conventional cache-based recording techniques, this processor avoids pushing the corresponding memory values onto the memory bus. Since the CCP message(s) associated with a given memory access are significantly smaller than a memory value associated with the memory access, a processor that records a component trace using the techniques herein pushes a significantly smaller amount of data onto the memory bus than a processor recording a trace using conventional cache-based recording techniques would push onto the memory bus.

Embodiments are directed to methods, systems, and computer program products that record a replayable execution trace based on recording CCP messages into a first trace, and on recording one or more memory snapshots into a second trace, in which the CCP messages are usable to obtain memory values from one or more memory snapshots. In these embodiments, a computer system determines that tracing of execution, by a plurality processing units of a processor, of a first execution context is to be enabled. Based on determining that tracing of execution of the first execution context is to be enabled, the computer system (i) initiates logging, into the second trace, of one or more memory snapshots of a memory space of the first execution context, and (ii) enables a hardware tracing feature of the processor. Enabling the hardware tracing feature of the processor causes the processor to log, into the first trace, one or more CCP messages generated in response to one or more memory access, by one or more of the plurality of processing units, into the memory space of the first execution context. After enabling the hardware tracing feature of the processor, the computer system performs at least one of the following in connection with execution of a second execution context (i) logging, into one or more of the first trace or the second trace, a write by the second execution context into the memory space of the first execution context; (ii) logging, into the second trace, an identity of a file mapped by the second execution context into the memory space of the first execution context; (iii) based at least on the second execution context writing to a cache line in the cache that overlaps with a memory location in memory space of the first execution context, evicting, or marking as invalid, the cache line from the cache; or (iv) based at least on the second execution context writing to a memory region within the memory space of the first execution context, marking the memory region as needing to be logged in connection with execution of the first execution context.

Embodiments are also directed to methods, systems, and computer program products for a processor that participates in recording a replayable execution trace based on recording one or more CCP messages into a first trace, in which the CCP messages are usable to obtain memory values from one or more memory snapshots stored within a second trace. In these embodiments, a processor that comprises one or more processing units and a cache executes control logic that causes the processor to detect a memory access by a first processing unit of the plurality of processing units. The memory access is targeted at a particular memory address during execution of an execution context. Based on detecting the memory access, the processor logs, into the first trace, information usable to obtain a memory value corresponding to the particular memory address from the one or more memory snapshots stored within the second trace. This includes logging the particular memory address and at least one of (i) a first CCP message indicating that none of the plurality of processing units possessed a first cache line within the cache that overlaps with the particular memory address; (ii) a second CCP message indicating that the first processing unit initiated a cache miss for the particular memory address; or (iii) a third CCP message indicating that the first processing unit obtained, from a second processing unit of the plurality of processing units, a second cache line within the cache that overlaps with the particular memory address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein separate an execution trace into component traces. In embodiments, separating an execution trace into component traces facilitates data separation and the ability to store the component traces into different security domains, with different data security policies, with different protections, etc. This protects sensitive memory values, such as PII, encryption keys, and the like, while providing many of the same opportunities to reduce recording overheads and/or to reduce the amount of data that is recorded into an execution trace as more conventional cache-based recording techniques. In embodiments, separating an execution trace into component traces facilitates also results in reduced memory bandwidth use when compared to more conventional cache-based recording techniques. In particular, at least some embodiments described herein record at least a portion of CCP messages communicated between a plurality of processing units as those processing units perform memory access for an execution context into a first component trace, and record one or more snapshots of at least a portion of system memory into a second component trace. In embodiments, the first component trace contains sufficient information to be useful for profiling and/or debugging the execution context (such as to analyze processor cache use by the execution context), but the first component trace lacks sufficient information to actually replay the recorded execution of the execution context. Nonetheless, replay of the recorded execution of the execution context can be accomplished by combining the information contained in the first component trace with the information contained in the second component trace.

Figure 1A:
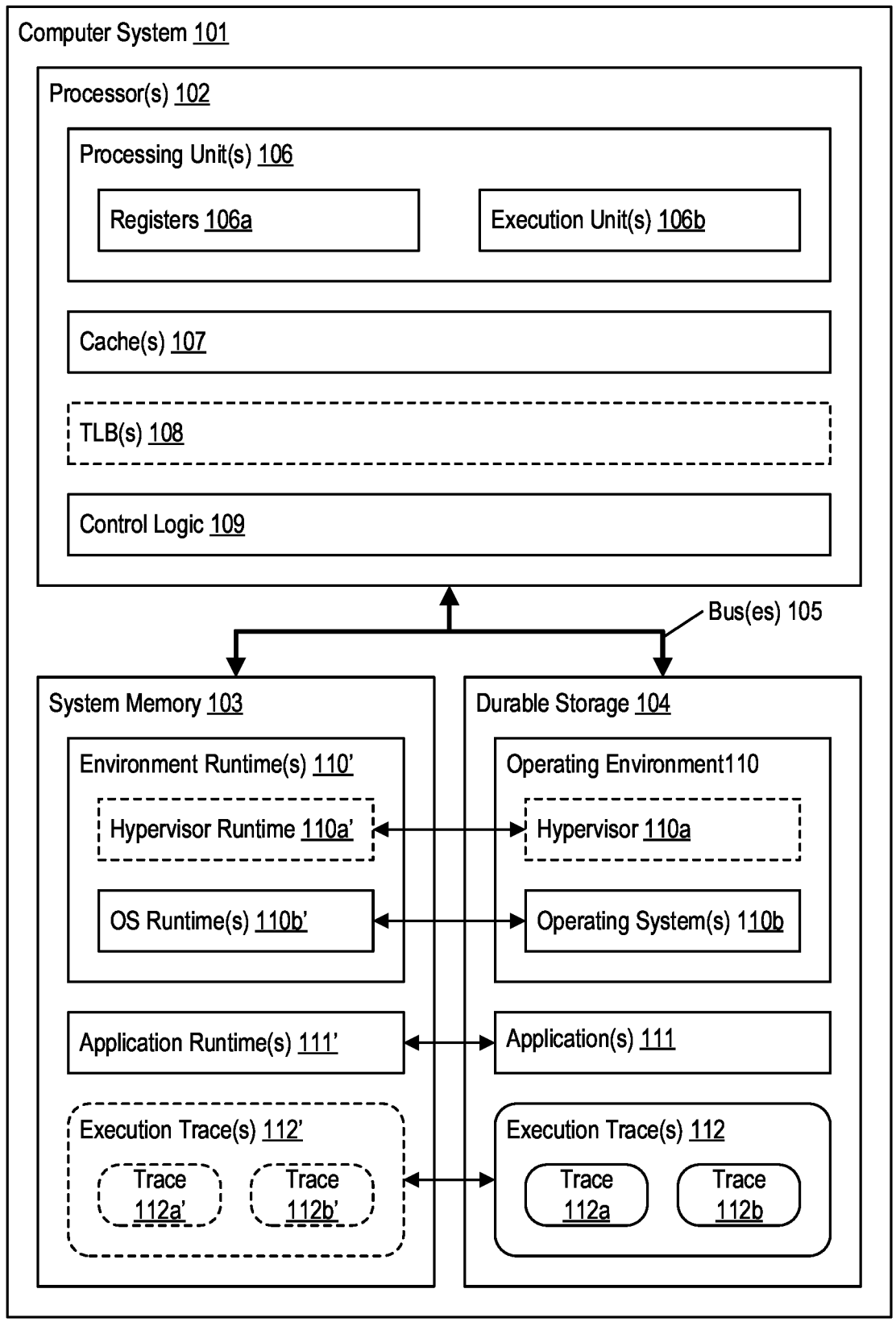
FIG. 1A illustrates an example computing environment that facilitates recording a replayable execution trace based on a processor recording CCP messages relating to memory accesses by a traced execution context into a first trace, without recording memory values associated with those memory accesses into the first trace, and based on an operating environment recording one or more memory snapshots into a separate second trace.

To the accomplishment of these, and other, embodiments, FIG. 1A illustrates an example computing environment 100 that facilitates recording a replayable execution trace based on a processor recording CCP messages relating to memory accesses by a traced execution context into a first trace, without recording memory values associated with those memory accesses into the first trace, and based on an operating environment recording one or more memory snapshots into a separate second trace. In particular, computing environment 100 includes a special-purpose or general-purpose computer system 101 that includes an operating environment 110 that is configured to record a replayable execution trace of an execution context based at least on recording one or more memory snapshots of the execution context's memory into one component trace. Correspondingly, computer system 101 includes one or more processors 102 that are configured to record one or more CCP messages into a separate component trace in connection with memory accesses by the traced execution context during its execution. The recorded CCP messages are usable to reconstruct memory values for those memory accesses using the memory snapshot(s) recorded by the operating environment 110. As shown, computer system 101 also includes at least system memory 103 (main memory) and durable storage 104, which are communicatively coupled to each other, and to the processor(s) 102, using one or more communications buses 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments each processor 102 includes one or more processing unit(s) 106, one or more cache(s) 107, control logic 109, and in some embodiments, one or more translation lookaside buffer(s) (TLBs) 108. In general, each processing unit 106 (e.g., processor core) executes machine code instructions at execution units 106b. During execution of these machine code instructions, at least some of the instructions use internal processor registers 106a as temporary storage locations, and/or read and write to various locations in system memory 103 via the cache(s) 107. Each processing unit 106 in a given processor 102 executes machine code instructions that are selected from among a predefined processor instruction set architecture (ISA) of its corresponding processor 102. The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware-based storage locations that are defined based on the ISA of their corresponding processor 102. In general, registers 106a are read from and/or written to by machine code instructions, or a processing unit 106, as those instructions execute at an execution unit 106b. Registers 106a are commonly used to store values fetched from the cache(s) 107 for use as inputs machine code instructions, to store the results of having executed machine code instructions, to store a program instruction count, to support maintenance of a thread stack, etc. In some embodiments, registers 106a can include "flags" that are used to signal some state change caused by having executed machine code instructions (e.g., to indicate if an arithmetic operation caused a carry, a zero result, etc.). In some embodiments, registers 106a include one or more control registers (e.g., which are used to control different aspects of processor operation), and/or other processor model-specific registers (MSRs).

The cache(s) 107 temporarily cache portions of system memory 103 during execution of machine code instructions by the processing unit(s) 106. In some embodiments, cache(s) 107 include one or more "code" portions that cache portions of system memory 103 storing application code, as well as one or more "data" portions that cache portions of system memory 103 storing application runtime data. If a processing unit 106 requires data (e.g., code or application runtime data) not already stored in the cache(s) 107, then the processing unit 106 initiates a "cache miss," causing the needed data to be fetched from system memory 103 and into the cache(s) 107—while potentially replacing and "evicting" some other data already stored in the cache(s) 107 back to system memory 103.

Figure 2:
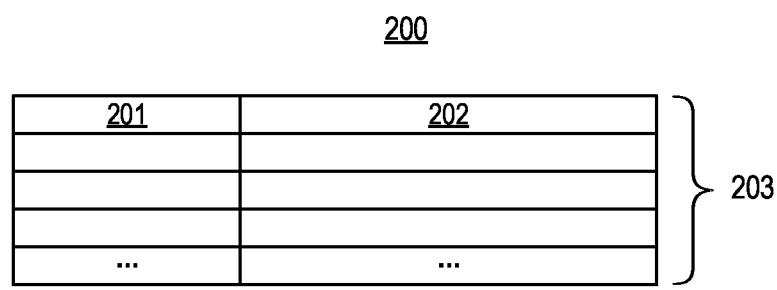
FIG. 2 illustrates an example processor cache.

In embodiments, each the cache(s) 107 comprise a plurality of "cache lines," each of which stores a chunk of memory from a backing store (e.g., system memory 103). For example, FIG. 2 illustrates an example of a processor cache 200 that includes a plurality of cache lines 203. In the example, each cache line 203 comprises at least an address portion 201 and a value portion 202. In embodiments, the address portion 201 of each cache line 203 is configured to store at least a memory address within system memory 103 to which the cache line corresponds, and the value portion 202 initially stores a data value obtained starting at that address in system memory 103. Depending on a size of the value portion 202, each cache line 203 could store data spanning a plurality of consecutive individually-addressable locations in system memory 103. The value portion 202 of each cache line 203 can be modified by processing units 106, and eventually be evicted back to system memory 103. As indicated by the ellipses within the processor cache 200, the cache(s) 107 can include a large number of cache lines. For example, a contemporary 64-bit INTEL processor may contain individual L1 caches for each processing unit 106 comprising 512 or more cache lines. In such a cache, each cache line is typically usable to store a 64-byte (512-bit) value in reference to a 6-byte (48-bit) to 8-byte (64-bit) memory address.

In some situations, an address portion of a cache line of the cache(s) 107 stores a physical memory address, such as the actual corresponding memory address in system memory 103. In other situations, an address portion of a cache line of the cache(s) 107 stores a virtual memory address. In embodiments, a virtual memory address is an address within a virtual address space that is exposed by an operating system to a process executing at processor(s) 102. This virtual address space provides one or more abstractions, such as that a process has its own exclusive memory space and/or that the process has more memory available to it than exists within system memory 103. Such abstractions can be used, for example, to facilitate memory isolation between different processes executing at the processor(s) 102, including isolation between user-mode processes and kernel mode processes. In embodiments, virtual to physical memory address mappings are maintained within memory page tables that are stored in system memory 103, and that are managed by an operating system and/or a hypervisor (e.g., operating environment 110). In general, these memory page tables comprise a plurality of page table entries (PTEs) that map ranges (i.e., pages) of virtual memory addresses to ranges (i.e., pages) of physical memory addresses. In embodiments, each PTE stores additional attributes, or flags, about its corresponding memory pages, such as memory page permissions (e.g., read-only, writeable, etc.), page state (e.g., dirty, clean, etc.), and the like. In embodiments, the TLB(s) 108 within each processor 102 facilitate virtual addressing, and comprise a dedicated form of cache that stores recently obtained PTEs mapping virtual and physical memory pages, as obtained from the memory page tables stored in system memory 103. In some implementations, PTEs are part of a multi-level hierarchy, which includes one or more page directory entries (PDEs) that support discovery of individual PTEs. In embodiments in which a processor 102 lacks a TLB 108, then that processor may lack support for virtual memory addressing.

In embodiments, the cache(s) 107 are divided into separate tiers, layers, or levels-such as layer 1 (L1), layer 2 (L2), layer 3 (L3), etc. Depending on processor implementation, one of these tiers could be part of the processor 102, itself (e.g., L1 and L2), and/or could be separate from the processor 102 (e.g., L3). Thus, in some embodiments, the cache(s) 107 comprise one of these layers (L1), while in other embodiments the cache(s) 107 comprise a plurality of these layers (e.g., L1 and L2, and even L3). In some embodiments, each of a plurality of processing units 106 includes, or is associated with its own L1 cache, while each L2 cache is a shared cache that serves as a backing store to two or more L1 caches (and is thus shared by two or more of the processing units 106). In embodiments, individual L1 caches are also considered to be shared, because they coordinate with each other via cache coherency protocol (CCP) messages. This coordination ensures data consistency as multiple processing units access the same memory location (e.g., by ensuring that each cached memory location is viewed consistently across all the L1 caches). In embodiments, multiple L2 and/or L3 caches similarly coordinate via the processor's CCP. If the processor(s) 102 support hyper-threading, each individual L1 cache may additionally be viewed being shared by two or more logical processing units.

A processor's CCP defines how consistency is maintained within the cache(s) 107 as the various processing unit(s) 106 of the processor(s) 102 read from and write to data in the cache(s) 107, and how to ensure that the various processing units 106 always read valid data from a given location in the cache(s) 107. CCPs are typically related to, and enable, a memory model defined by the processor's ISA. Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in a shared cache. A "modified" cache location contains data that has been modified in the cache and is therefore inconsistent with the corresponding data in the backing store (e.g., system memory 103 or another cache). When a location having the "modified" state is evicted from the cache, common CCPs require the cache to guarantee that its data is written back the backing store, or that another cache take over this responsibility. A "shared" cache location contains data that is unmodified from the data in the backing store, exists in read-only state, and is shared by the processing unit(s) 106. The cache can evict this data without writing it to the backing store. An "invalid" cache location contains no valid data and can be considered empty and usable to store data from cache miss. An "exclusive" cache location contains data that matches the backing store and is used by only a single processing unit 106. It may be changed to the "shared" state at any time (i.e., in response to a read request) or may be changed to the "modified" state when writing to it. An "owned" cache location is shared by two or more processing units 106, but one of the processing units has the exclusive right to make changes to it. When that processing makes changes, it notifies the other processing units-since the notified processing units may need to invalidate or update based on the CCP implementation. In embodiments, there is an inherent total ordering of CCP messages.

In embodiments, control logic 109 of each processor 102 comprises microcode (i.e., executable instructions) and/or on-die gate logic that controls operation of the processor 102. In general, control logic 109 functions as an interpreter between the hardware of the processor 102 and the processor ISA exposed by the processor 102 to executing applications (e.g., operating environment 110 and application(s) 111) and controls internal operation of the processor 102. In embodiments, the control logic 109 is embodied on on-processor storage, such as ROM, EEPROM, etc. In some embodiments, this on-processor storage is writable (in which case the control logic 109 is updatable), while in other embodiments this on-processor storage is read-only (in which case the control logic 109 cannot be updated).

Although not illustrated, in some embodiments the processor(s) 102 support creation of one more secure memory enclaves that can store data and/or executable instructions. For example, in embodiments the processor(s) 102 provide machine code instructions (e.g., INTEL SOFTWARE GUARD EXTENSIONS (SGX)) that allow user-level as well as operating system code to define private regions of memory, called enclaves, whose contents are protected and unable to be either read or saved by any process outside the enclave itself-including processes running at higher privilege levels. In embodiments, a processor 102 supporting enclaves encrypts a portion of system memory 103; this portion of memory is then decrypted only within the processor 102 itself, and even then, only for code and data running from within the enclave.

The durable storage 104 stores computer-executable instructions and/or data structures representing executable software components. Correspondingly, during execution of these software components at the processor(s) 102, one or more portions of these computer-executable instructions and/or data structures are loaded into system memory 103. For example, the durable storage 104 is illustrated as storing computer-executable instructions and/or data structures corresponding to an operating environment 110 and one or more application(s) 111. Correspondingly, the system memory 103 is shown as storing one or more operating environment runtime(s) 110' (e.g., machine code instructions and/or runtime data supporting execution of the operating environment 110), and as storing one or more application runtime(s) 111' (e.g., machine code instructions and/or runtime data supporting execution of one or more of application(s) 111).

In FIG. 1A, operating environment 110 is shown as potentially including a hypervisor 110a, and as including one or more operating system(s) 110b. Correspondingly, the operating environment runtime(s) 110' is shown as potentially including a hypervisor runtime 110a', and as including one or more operating system runtime(s) 110b'. For example, in some embodiments, the operating environment 110 comprises the hypervisor 110a executing directly on the hardware (e.g., processor(s) 102, system memory 103, and durable storage 104) of computer system 101, and one or more of the operating system(s) 110b executing on top of the hypervisor 110a. In other embodiments, however, the operating environment 110 comprises an operating system 110b executing directly on the hardware (e.g., processor(s) 102, system memory 103, and durable storage 104) of computer system 101.

In embodiments, the system memory 103 and durable storage 104 also store other data, such as one or more replayable execution trace(s) (i.e., execution trace(s) 112' stored in system memory 103 and/or execution trace(s) 112 stored in durable storage 104). In some embodiments, a replayable execution trace is initially stored in system memory 103 during that trace's generation (i.e., execution trace 112'), and may subsequently be persisted to durable storage 104 (i.e., execution trace 112). In other embodiments, a replayable execution trace is initially stored in on durable storage 104 during its generation (i.e., execution trace 112). As shown, in the embodiments herein each execution trace 112/112'comprises two component traces (or component trace data streams), component trace 112a/112a' and component trace 112b/112b'. In embodiments, component trace 112a/112a' is generated directly by the processor(s) 102 (e.g., under direction of control logic 109), and component trace 112b/112b' is generated by the operating environment 110. The particular contents of each component trace 112a/112a' and 112b/112b' will be discussed later. For brevity, going forward this disclosure refers to execution trace(s) using the 112 reference numeral, and refers to the component traces using the 112a and 112b reference numerals. Unless otherwise specified expressly or by context, any use of reference numeral 112 additionally, or alternatively, applies to reference numeral 112'; any use of reference numeral 112a additionally, or alternatively, applies to reference numeral 112a'; and any use of reference numeral 112b additionally, or alternatively, applies to reference numeral 112b'. Notably, some embodiments store component traces 112a and 112b together (e.g., as data streams within the same file, as files within the same directory, etc.), while other embodiments store component traces 112a and 112b separately-such as on different storage devices, at different computer systems, etc. In embodiments, storing component traces 112a and 112b separately enables these component traces 112a and 112b to be stored within different security domains, under different security policies, using different security protections, etc.

In embodiments, each replayable execution trace 112 comprises a "bit-accurate" record of execution of a corresponding context (e.g., process, operating system, virtual machine, enclave, hypervisor, etc.) as that context executed at the processor(s) 102. Thus, as used herein, a replayable execution trace is a "bit accurate" record of that context's execution activity. This bit-accurate record enables machine code instructions that were previously executed as part of the context at the processing unit(s) 106 to be replayed later, such that, during replay, these machine code instructions are re-executed in the same order and consume the same data that they did during trace recording. The cache-based tracing techniques used by the embodiments herein are built upon an observation that each processor 102 (including its the cache(s) 107) comprises a semi- or quasi-closed system. For example, once portions of data for an executing context (i.e., machine code instructions and runtime data) are loaded into a processor's cache(s) 107, a processing unit 106 can continue executing that context—without any other external input—as a semi- or quasi-closed system for bursts of time. In particular, once the cache(s) 107 are loaded with machine code instructions and runtime data, the execution units 106b can load and execute those machine code instructions from the code portion(s) of the cache(s) 107, using runtime data stored in the data portion(s) of the cache(s) 107 as input to those machine code instructions, and using the registers 106a. So long as the data (i.e., machine code instructions and runtime data) that are needed for the processor 102 to execute that a exists within the cache(s) 107, the processor 102 can continue executing that context without further external input.

When a processing unit 106 needs some influx of data (e.g., because a machine code instruction it is executing, will execute, or may execute, accesses code or runtime data not already in the cache(s) 107), the processor 102 conducts a "cache miss," importing appropriate data into the cache(s) 107 from the system memory 103. For example, if a data cache miss occurs when a processing unit 106 executes a machine code instruction that performs a memory operation on a memory address within application runtime 111' storing runtime data, the processor 102 imports runtime data from that memory address in the system memory 103 to one of the cache lines of the data portion of the cache(s) 107. Similarly, if a code cache miss occurs when a processing unit 106 tries to fetch a machine code instruction from a memory address within application runtime 111' storing application code, the processor 102 imports code data from that memory address in system memory 103 to one of the cache lines of the code portion of the cache(s) 107. The processing unit 106 then continues execution using the newly-imported data, until new data is needed.

In embodiments, and as a general overview, the control logic 109 of each processor 102 is configured to participate in recording a bit-accurate representation of an executing context by recording, into a component trace 112a corresponding the executing context, indicia of at least a subset of CCP messages communicated among the processing unit(s) 106 of the processor and/or with other processor(s)

102 in connection with memory accesses made by the executing context via the cache(s) 107. In embodiments, for memory accesses made by the executing context via the cache(s) 107, the control logic 109 records into component trace 112a the memory addresses that were accessed, but refrains from recording any corresponding memory values. The operating environment 110, on the other hand, is configured to participate in recording the bit-accurate representation of the executing context by recording, into another component trace 112b corresponding the executing context, at least one or more memory values as obtained from system memory 103 (e.g., in the form of one or more memory snapshots). As will be explained in more detail later, component trace 112a is usable to identify which memory addresses were accessed by the context as it executed (including which processing unit made each access, and in what order), while component trace 112b is usable to obtain and/or compute the memory value(s) that were accessed. Thus, component traces 112a and 112b are combinable to reproduce the influxes of information into the processor's cache(s) 107 as the processor's processing units 106 executed the context's code.

In embodiments, the control logic 109 of each processor 102 also configured to record, into component trace 112a any uncached reads made by the executing context (e.g., reads from a direct memory access (DMA) hardware device, reads from portions of system memory 103 that are flagged as uncacheable, etc.), and was well as one or more side-effects of the execution of any non-deterministic instructions (e.g., register values changed by execution of the non-deterministic instruction). In embodiments, and as will be explained in more detail later, one or both of the control logic 109 or the operating environment 110 also account for activity by other execution context(s) that modifies the memory space of the execution context's that is being recorded.

Figure 3:
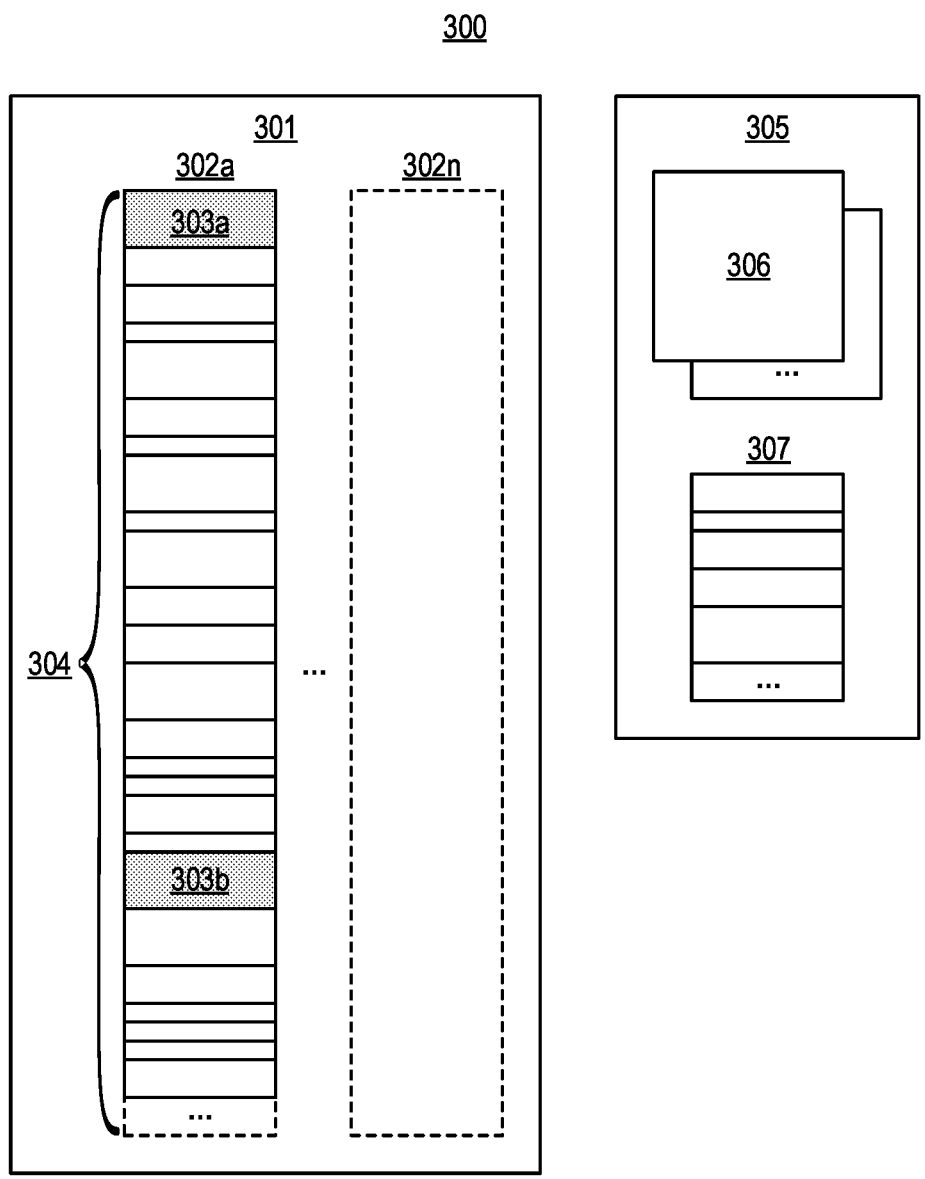
FIG. 3 illustrates an example of an execution trace.

FIG. 3 illustrates an example of an execution trace (e.g., one of execution trace(s) 112). In particular, FIG. 3 illustrates an execution trace 300 that includes a first component trace 301 (e.g., corresponding to component trace 112a) and a separate and distinct second component trace 305 (e.g., corresponding to component trace 112b). In general, component trace 301 stores information recorded directly by the processor(s) 102 (e.g., under the direction of tracer 117 within control logic 109), while component trace 305 stores information recorded by the operating environment 110 (e.g., under the direction of tracer 118).

As shown, component trace 301 includes one or more data streams 302 (i.e., data streams 302a-302n). In embodiments, different data streams 302 correspond to different threads, to different types of trace data, to different trace data security domains, etc. As demonstrated by data stream 302a, in embodiments each data stream 302 comprises a plurality of data packets 304. Since the particular data logged in each data packet 304 varies depending on the particular data begin represented by the data packet, these data packets 304 are illustrated as having varying sizes. In embodiments, data packets 304 are used to record information such as CCP messages (or indicia thereof) relating to memory accesses processed via the cache(s) 107, memory address information relating to memory accesses processed via the cache(s) 107, the value(s) of one or more of register(s) 106a, hashes of the value(s) of one or more of register(s) 106a, timing information (e.g., instruction counts), code trace information (e.g., from a branch or call trace), logs of uncached reads (i.e., read memory accesses that bypass the cache(s) 107), references to instructions executed (e.g., using addresses or offsets within an application binary image), and the like. In embodiments, data stream 302a also includes data packets comprising one or more key frames 303 (e.g., key frames 303a and 303b) that each records information, such as a snapshot of register values, that is sufficient to restore a beginning processor state to initiate a trace replay. Component trace 305, on the other hand, includes one or more memory snapshots 306 that store memory value(s) obtained from system memory 103. In some embodiments, component trace 305 also includes a data stream 307 that comprises data packets that store, for example, memory writes, timing information, count information, ordering information, etc. In view of this description, it will be appreciated that component trace 301 primarily comprises a record of instruction execution and cache activity by the processor(s) 102, but generally lacks the memory values that were read by the processor(s) 102. Component trace 305, on the other hand, primarily comprises "bulk data," such as in the form of memory snapshots, from which values that were read can be obtained.

In embodiments, an execution trace 112 also includes the actual code that was executed by the processing units 106, such as by storing a record of the instructions executed within a trace data stream 302 of component trace 301, or by storing a copy of an application binary within component trace 305. In other embodiments, however, an execution trace 112 omits the actual code that was executed, instead relying on having separate access to application code (e.g., application 111).

Figure 1C:
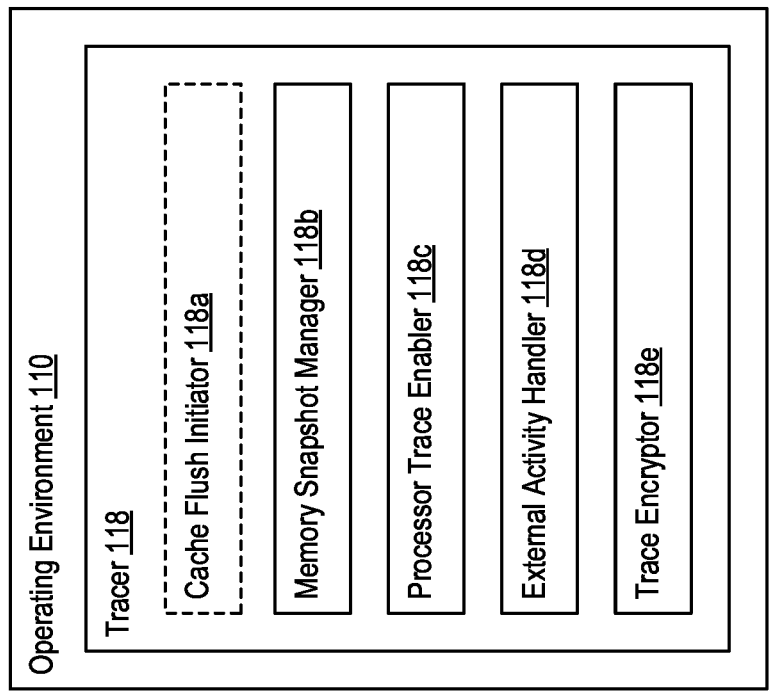
FIG. 1C illustrates an example an operating environment that participates in recording a replayable execution trace based at least on recording one or more memory snapshots into a second trace.
Figure 1B:
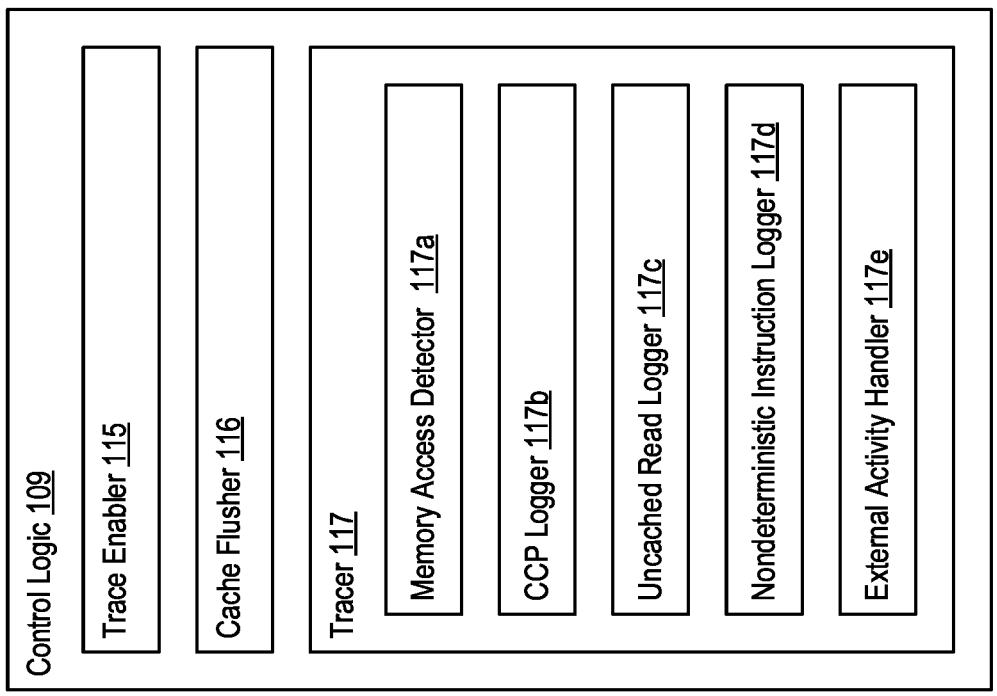
FIG. 1B illustrates an example of processor control logic that participates in recording a replayable execution trace based on a processor recording CCP messages relating to memory accesses by a traced execution context into a first trace, without recording memory values associated with those memory accesses into the first trace.

To illustrate some embodiments of how the operating environment 110 and the control logic 109 accomplish recording a bit-accurate representation of an executing context into different component traces 112a and 112b, FIG. 1B illustrates additional detail of control logic 109, including components (e.g., trace enabler 115, cache flusher 116, tracer 117, etc.) that embodiments of the control logic 109 use when recording execution of an executing context into a first component trace 112a. Additionally, FIG. 1C illustrates additional detail of operating environment 110, including components of a tracer 118 (e.g., cache flush initiator 118a, memory snapshot manager 118b, processor trace enabler 118c, external activity handler 118d, trace encryptor 118e, etc.) that embodiments of the operating environment 110 use when recording execution of an executing context into a second component trace 112b. The depicted components of control logic 109 and operating environment 110, together with any sub-components, represent various functions that the control logic 109 and/or the operating environment 110 might implement or utilize in accordance with various embodiments described herein. It will be appreciated, however, that the depicted components—including their identity, sub-components, and arrangement—are presented merely as an aid in describing various embodiments of the control logic 109 and/or the operating environment 110 described herein, and that these components are non-limiting to how software and/or hardware might implement various embodiments of the control logic 109 and/or the operating environment 110 described herein, or of the particular functionality thereof.

As a general introduction to operating environment 110, a hypervisor 110a and/or an operating system 110b includes a tracer 118 that provides support for initiating tracing of one or more execution context(s) at the processor(s) 102, and for creating component trace(s) 112b of those context(s). In embodiments, the tracer 118 executes, at least in part, as a component of the hypervisor 110a, and/or as a kernel-mode component of at least one of operating system(s) 110b. In other embodiments, the tracer 118 executes, at least in part, as a user-mode component of at least one of operating system(s) 110b. In embodiments, the tracer 118 has a plurality of portions that execute within the context of two or more of (i) a user-mode of at least one of operating system(s) 110b, (ii) a kernel mode of at least one of operating system(s) 110b, or (iii) the hypervisor 110a. In some embodiments, tracer 118 is an integrated component of the hypervisor 110a and/or at least one of operating system(s) 110b, while in other embodiments tracer 118 is provided (e.g., by an application 111) as an extension to the hypervisor 110a and/or the operating system(s) 110b (e.g., as an operating system driver, kernel extension, kernel module, hypervisor module or extension, etc.). Thus, even though tracer 118 is illustrated executing (at least in part) as a component of operating environment 110, tracer 118 could actually be provided to operating environment 110 by a third-party (e.g., via one of application(s) 111).

Now turning to the components of the tracer 118, in some embodiments, prior to initiating tracing for a given execution context, the cache flush initiator 118a ensures that the cache(s) 107 are in a known state by flushing and/or invalidating one or more portions of the cache(s) 107, or ensures that the cache(s) 107 are in a reproducible state by snapshotting one or more portions of the cache(s) 107 (e.g., into one of component traces 112a or 112b). In some embodiments, the cache flush initiator 118a flushes, invalidates, or snapshots only those cache lines corresponding to memory pages within a memory space of the execution context for which tracing is being enabled. The cache flush initiator 118a is shown in broken lines since, in some embodiments, it is the control logic 109 that flushes, invalidates, and/or snapshots the cache(s) 107 (e.g., in response to a request for tracing to be enabled for an execution context).

Also prior to initiating tracing for a given execution context, the memory snapshot manager 118b initiates storing of one or more snapshots of system memory 103 into component trace 112b (e.g., as memory snapshot(s) 306). In some embodiments, the memory snapshot manager 118b snapshots only those portion(s) of system memory 103 that correspond to the memory space of the execution context for which tracing is being enabled. In embodiments, memory snapshot manager 118b associates memory snapshots with a timestamp, a count, etc. There are various embodiments for how the memory snapshot manager 118b initiates memory snapshots. In some embodiments, the memory snapshot manager 118b stores at least one memory snapshot into component trace 112b prior to initiating tracing of an execution context. In some embodiments, this memory snapshot includes each physical memory page that has been mapped into the memory space of the execution context for which tracing is being enabled. In a variation of this embodiment, this memory snapshot includes only those physical memory pages that actually exist within system memory 103—i.e., only physical memory pages that have not been paged out to a swap file or swap partition (e.g., on durable storage 104). In this variation, the memory snapshot manager 118b only snapshots a paged-out physical memory page into component trace 112b if that page is later paged back into system memory. In another embodiment, the memory snapshot manager 118b initiates a memory snapshot by tracking which memory pages are actually accessed by the traced execution context, and the memory snapshot manager 118b snapshots those pages on-demand when they are actually accessed by the traced execution context. In some embodiments, in addition to initiating memory snapshot(s) prior to initiating tracing an execution context, the memory snapshot manager 118b also initiates and stores occasional memory snapshots later during execution of the traced execution context. In various embodiments, these subsequent memory snapshots are independent memory snapshots, or are differential memory snapshots that are dependent on one or more prior memory snapshots.

The processor trace enabler 118c initiates hardware tracing features at the processor(s) 102 for a given execution context, such as via execution of appropriate instruction(s) at the processor(s) 102. In embodiments, initiating hardware tracing features at the processor(s) 102 includes the processor trace enabler 118c communicating to the processor(s) 102 an identity of an execution context for which tracing is to be enabled, such as via setting a value in system memory 103 or in a register 106a. In some embodiments an execution context's identity is communicated via a virtual processor identifier (VPID).

In many situations, a traced execution context may execute concurrently, or sequentially, with one or more other execution contexts, such as an operating system kernel. In some situations, one (or more) of these "external" execution context(s) may write into the memory space of the trace execution context. In one example, in response to an interrupt from a hardware device, an operating system kernel processes a direct memory access (DMA) request that writes into the trace context's memory space. In embodiments, the external activity handler 118d ensures that any writes into the traced context's memory space are either logged into execution trace 112, or that some other action is taken to ensure that the write is accounted for. In some embodiments, the external activity handler 118d invokes the memory snapshot manager 118b in order to create one or more snapshots of the modified memory (e.g., within memory snapshot(s) 306). In some embodiments, the external activity handler 118d logs one or more writes into a data stream of component trace 112b (e.g., within data stream 306). In some embodiments, the external activity handler 118d instructs the processor(s) 102 to log one or more writes into component trace 112b (e.g., via a communication to external activity hander 117e). In embodiments, the external activity handler 118d associates logged writes with a timestamp, a count, etc. In some embodiments, the external activity handler 118d causes any cache lines in the cache(s) 107 that were modified by the write(s) to be evicted or invalidated (thereby ensuring a cache miss later if the trace context reads the modified memory location(s). In some embodiments, the external activity handler 118d marks a memory page corresponding to the write for later logging (e.g., by at trap to tracer 118 in connection with a later execution of the traced execution context).

Since the component trace 112b contains memory snapshots, and potentially includes information relating to writes to the trace context's memory space, it is possible that the component trace 112b contains sensitive information (e.g., PII, encryption keys, etc.). Thus, in embodiments, the trace encryptor 118e encrypts all, or a part, of the component trace 112b in order to protect this sensitive information.

Turning now to control logic 109, the trace enabler 115 enables hardware-based tracing functions of the processor 102. In embodiments, the trace enabler 115 operates in response to a request from the operating environment 110 (e.g., from processor trace enabler 118c). Prior to enabling tracing, the cache flusher 116 ensures that the cache(s) 107 are in a known state by flushing and/or invalidating one or more portions of the cache(s) 107, or ensures that the cache(s) 107 are in a reproducible state by snapshotting one or more portions of the cache(s) 107 (e.g., into one of component traces 112a or 112b). In some embodiments, the cache flusher 116 operates in response to an instruction from cache flush initiator 118a, while in other embodiments the cache flusher 116 operates in response to an instruction from trace enabler 115. As will be understood in view of the foregoing discussion of the cache flush initiator 118a, in some embodiments the cache flusher 116 flushes, invalidates, or snapshots only those cache lines corresponding to memory pages within a memory space of the execution context for which tracing is being enabled.

The tracer 117 is responsible for logging certain types of processor activity, such as CCP messages, into component trace 112a. In embodiments, a memory access detector 117a detects when a processing unit 106 executing a traced execution context makes an access to a target memory address within system memory 103. In some situations, a memory access is directed to a target memory address cached by the cache(s) 107. In these situations, based at least on the memory access having been detected by the memory access detector 117a, a CCP logger 117b determines whether or not to log one or more CCP message(s) in connection with the memory access, and initiates any appropriate logging into component trace 112a. In embodiments, the CCP logger 117b associates logged CCP message(s) with a timestamp, a count, etc.

Figure 4A:
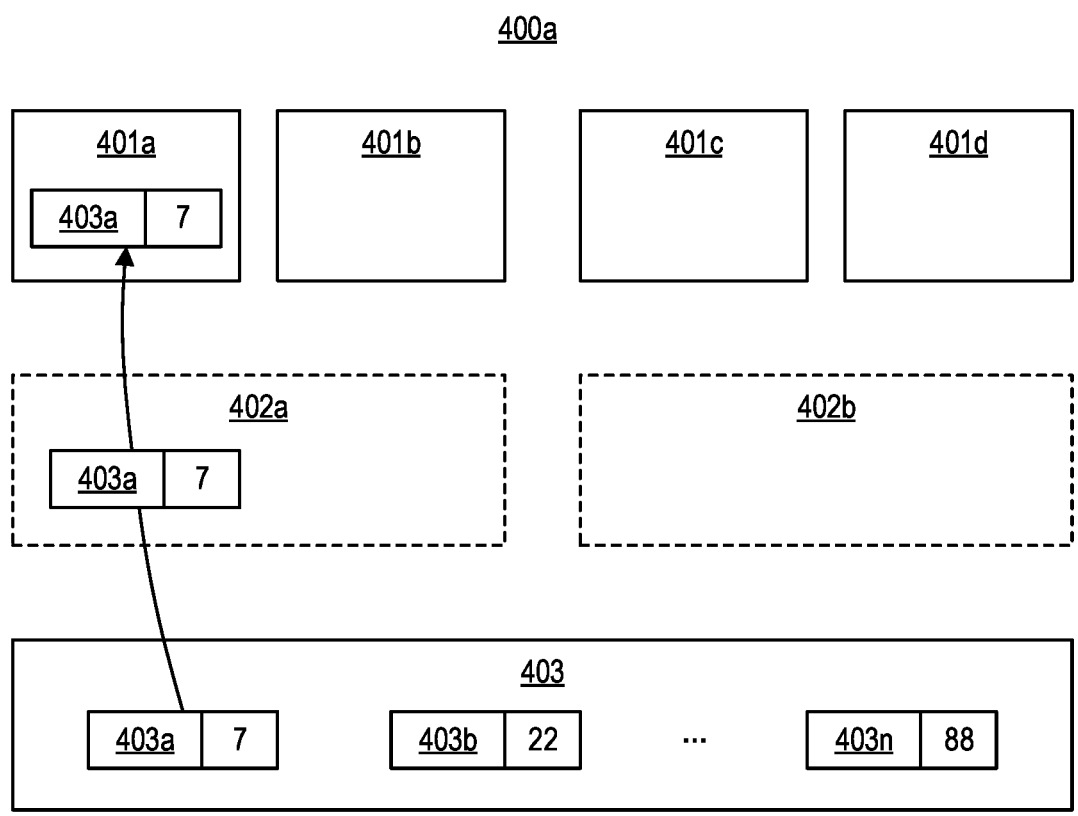
FIGS. 4A-4C illustrate example memory access activity by a plurality of processing units.
Figure 4B:
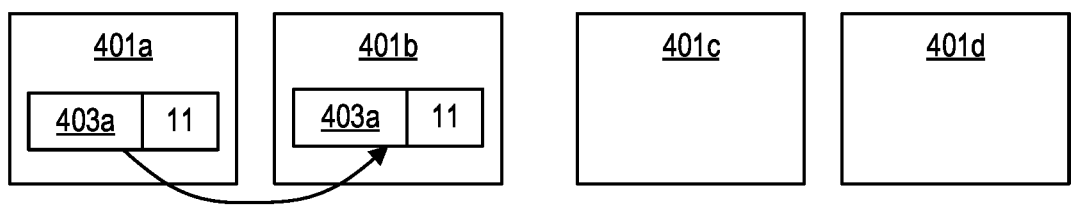
Figure 4B:
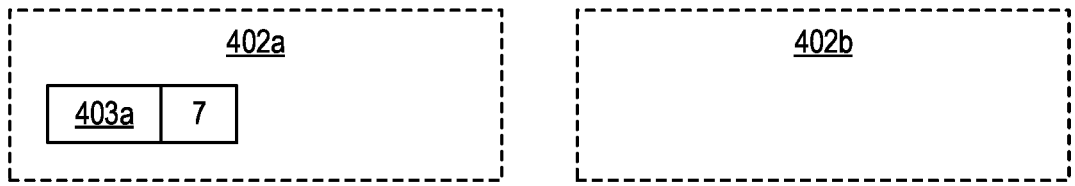
Figure 4B:
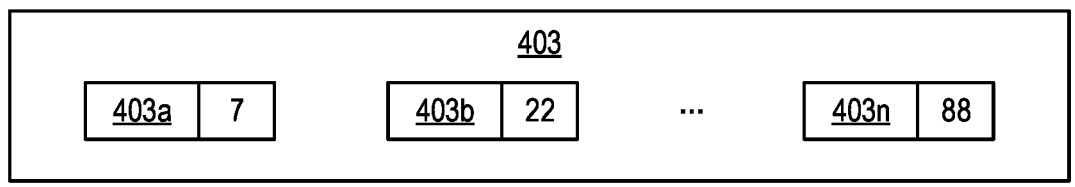
Figure 4C:
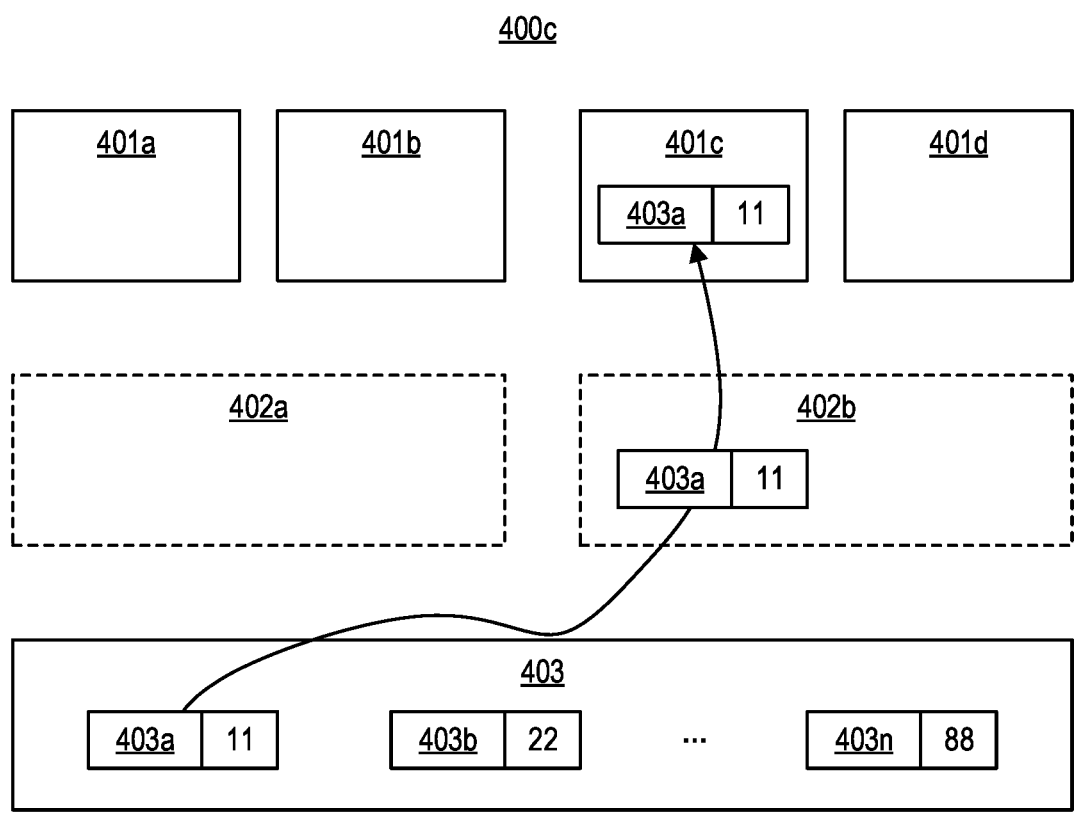

Examples of CCP message logging are now provided in reference to FIGS. 4A-4C, which illustrate example memory access activity by a plurality of processing units. In particular, FIG. 4A illustrates an example 400a that includes for processing units 401 (i.e., processing units 401a-401d), and that may include two shared caches 402 (i.e., shared cache 402a that is shared by processing units 401a and 401b and shared cache 402b that is shared by processing units 401c and 401d), and a system memory 403. Example 400a shows that system memory 403 has a plurality of memory locations, each storing a corresponding memory value (i.e., memory location 403a storing the value 7, memory location 403b storing the value 22, etc.). In example 400a, processing unit 401a executes an instruction that access (e.g., reads from or writes to) memory location 403a. In embodiments, processing unit 401a sends a CCP message to the other processing units 401 to inquire if any of the other processing units have a cached copy of memory location 403a. In example 400a, none of processing units 401b, 401c, or 401d have a cached copy of memory location 403a. As such, processing unit 401a initiates a cache miss on memory location 403a (e.g., based on processing unit 401a having received negative responses from processing units 401b, 401c, and 401d; or based on processing unit 401a having received no affirmative responses from processing units 401b, 401c, and 401d). Thus, as shown, processing unit 401a obtains (e.g., into its L1 cache) a cached copy of memory location 403a, including the value 7. As shown, if included, shared cache 402a (e.g., an L2 cache) may also obtain a copy of memory location 403a, including the value 7. In embodiments, the CCP logger 117b logs one or more first CCP messages into component trace 112a providing one or more indicia of processing unit 401a having obtained memory location 403a from system memory 403, such as one or more CCP messages indicating that no other processing unit had a copy of memory location 403a (e.g., a copy of negative response(s) from processing units 401b, 401c, and 401d; one or more indicia that processing unit 401a received no affirmative response from processing units 401b, 401c, and 401d, etc.), one or more CCP messages indicating that processing unit 401a initiated a cache miss on an address of memory location 403a (perhaps rounded by cache line number), and the like.

Turning to FIG. 4B, in example 400b processing unit 401a has written the value 11 to memory location 403a. Subsequently, processing unit 401b executes an instruction that access memory location 403a. In embodiments, processing unit 401b sends a CCP message to the other processing units 401 to inquire if any of the other processing units have a cached copy of memory location 403a. In example 400b, processing unit 401a has a cached copy of memory location 403a, and thus processing unit 401a sends a CCP message to processing unit 401b indicating such. Thus, as shown, processing unit 401b obtains (e.g., into its L1 cache) a cached copy of memory location 403a, including the value 11, from processing unit 401a (e.g., from processing unit 401a's L1 cache). In embodiments, the CCP logger 117b logs one or more second CCP messages into component trace 112a providing one or more indicia of processing unit 401b having obtained memory location 403a from processing unit 401a's L1 cache, such a copy of the CCP message processing unit 401a sent to processing unit 401b.

Turning to FIG. 4C, in example 400c processing units 401a and/or 401b have evicted memory location 403a from their caches, and thus system memory 403 now stores the value 11 for memory location 403a. In some embodiments, the CCP logger 117b logs one or more third CCP messages into component trace 112a providing one or more indicia of these eviction(s). Subsequently, processing unit 401c executes an instruction that accesses memory location 403a. In embodiments, processing unit 401c sends a CCP message to the other processing units 401 to inquire if any of the other processing units have a cached copy of memory location 403a. In example 400c, none of processing units 401a, 401b, or 401d have a cached copy of memory location 403a. As such, processing unit 401c initiates a cache miss on memory location 403a (e.g., based on processing unit 401c having received negative responses from processing units 401a, 401b, and 401d; or based on processing unit 401c having received no affirmative responses from processing units 401b, 401c, and 401d). Thus, as shown, processing unit 401c obtains (e.g., into its L1 cache) a cached copy of memory location 403a, including the value 11. As shown, if included, shared cache 402b (e.g., an L2 cache) may also obtain a copy of memory location 403a, including the value 11. In embodiments, the CCP logger 117b logs one or more fourth CCP messages into component trace 112a providing one or more indicia of processing unit 401c having obtained memory location 403a from system memory 403, such as one or more CCP messages indicating that no other processing unit had a copy of memory location 403a (e.g., a copy of negative response(s) from processing units 401a, 401b, and 401d; one or more indicia that processing unit 401c received no affirmative response from processing units 401a, 401b, and 401d, etc.), one or more CCP messages indicating that processing unit 401c initiated a cache miss on an address of memory location 403a (perhaps rounded by cache line number), and the like.

Notably, the memory accesses in examples 400a-400c are reproducible based on an initial memory snapshot of system memory 403 (e.g., within component trace 112b), and based at least on the CCP messages logged by the CCP logger 117b (within component trace 112a). For example, the access to memory location 403a by processing unit 401a in example 400a (i.e., reading the value 7) is reproducible by using the one or more first CCP messages to reproduce the cache miss to system memory 403 (and using a memory snapshot to obtain the value 7). The access to memory location 403a by processing unit 401b in example 400b (i.e., reading the value 11) is reproducible by replaying the instructions by processing unit 401a that wrote the value 11 to memory location 403a, and by using the one or more second CCP messages to reproduce processing unit 401b obtaining the value of memory location 403a from processing unit 401a. The access to memory location 403a by processing unit 401c in example 400c (i.e., reading the value 11) is reproducible by using the one or more fourth CCP messages to reproduce the cache miss to system memory 403. Notably, knowledge that value of 11 was now in memory location 403a within system memory 403 is reproducible using the one or more third CCP messages (evictions) or, if the one or more third CCP messages were not recorded, via inference with knowledge that the write by processing unit 401a occurred prior to the read by processing unit 401c. Thus, all access to main memory in examples 400a-400c are reproducible without logging any memory values into component trace 112a.

In other situations, a memory access is directed to an "uncached" target memory address, and therefore the memory access bypasses the cache(s) 107. In these situations, based at least on the memory access having been detected by the memory access detector 117a, an uncached read logger 117c logs the memory access into an execution trace 112. In some embodiments, the uncached read logger 117c logs, into the execution trace 112, one or both of the target memory address of the memory access or a value that was read by the uncached memory access. When logging a value read by the uncached memory access, some embodiments of the uncached read logger 117c log the value into component trace 112a. In some of these embodiments, the uncached read logger 117c encrypts the value within component trace 112a. In one example, the uncached read logger 117c encrypts a data packet 304, or portion thereof, within component trace 112a that stores the value. In another example, the uncached read logger 117c stores the value within an encrypted data stream within the component trace 112a. Other embodiments of the uncached read logger 117c log the value into component trace 112b, such as via a trap to the tracer 118. In embodiments, the uncached read logger 117c associates logged uncached reads with a timestamp, a count, etc.

At times, a traced context may execute a non-deterministic processor instruction, which is defined as an instruction whose output(s) does not rely solely on its input(s). As an example, the RDTSC instruction in the INTEL IA-64 and IA-32 architectures takes no inputs and, when called, it returns a value of the processor's time stamp counter into a register as an output. Thus, the instruction's output does not rely solely on its inputs. In embodiments, a nondeterministic instruction logger 117d logs execution of a non-deterministic instruction based on recording one or more side-effects of execution of that instruction. In embodiments, side-effects of execution of an instruction include modifications to one or more of registers 106a. Thus, in embodiments, the nondeterministic instruction logger 117d logs execution of a non-deterministic instruction based at least recoding into component trace 112a the value(s) of one or more of registers 106a that were modified by execution of the instruction. In embodiments, the nondeterministic instruction logger 117d associates logged nondeterministic instructions with a timestamp, a count, etc.

As mentioned in connection with the external activity handler 118d of operating environment 110, a traced execution context may execute concurrently, or sequentially, with one or more other execution contexts, and one (or more) of these "external" execution context(s) may write into the memory space of the trace execution context. In embodiments, external activity handler 117e operates in cooperation with, or instead of, the external activity handler 118d to ensure that any writes into the traced context's memory space are either logged into execution trace 112, or that some other action is taken to ensure that the write is accounted for. In some embodiments, the external activity handler 117e logs at least one of a memory address or a value of the write into component trace 112a (e.g., into an encrypted data stream or data packet) or component trace 112b. In embodiments, the external activity handler 117e associates logged writes with a timestamp, a count, etc. In some embodiments, the external activity handler 117e evicts or invalidates a cache line overlapping with the memory address of the write. In some embodiments, the external activity handler 117e marks a memory page corresponding to the memory address of the write as needing to be logged. In some embodiments, the external activity handler 117e initiates a trap handler (e.g., via a software interrupt) that logs the memory page corresponding to the memory address.

As indicated, some embodiments associate some events with a timestamp, a count, etc. As also indicated, there is an inherent total ordering of CCP messages. Thus, in some embodiments an ordering of related events across component traces 112a and 112b are identifiable based on one or both of the inhering ordering of logged CCP events (e.g., CCP messages logged into component trace 112a), or the timestamps, counts, etc. associated with other logged events (e.g., writes, nondeterministic instructions, memory snapshots, etc. logged into component trace 112a and/or component trace 112a). Notably, in embodiments only the general ordering of events, rather than the exact timing of events, needs to be identified. For example, if user mode execution context reads from a given memory location, a kernel execution context later writes to that memory location, and the user space execution context subsequently reads from that memory location again, some embodiments record sufficient information to order the write after the first read and prior to the second read, but may not record the exact timing of the write. In embodiments, all that is needed for a proper replay is to be able to apply the write to any time within the window between the first and second reads. In one example, the first and second reads are logged (e.g., into component trace 112a) as CCP messages by the CCP logger 117b, and the write is logged (e.g., into component trace 112b) in reference to an instruction count by the external activity handler 118d. Since CCP messages are inherently orderable among each other, in this example, if the instruction count is orderable within the CCP protocol, that instruction count is sufficient to order the write between the first and second reads.

Figures 5A, 5B:
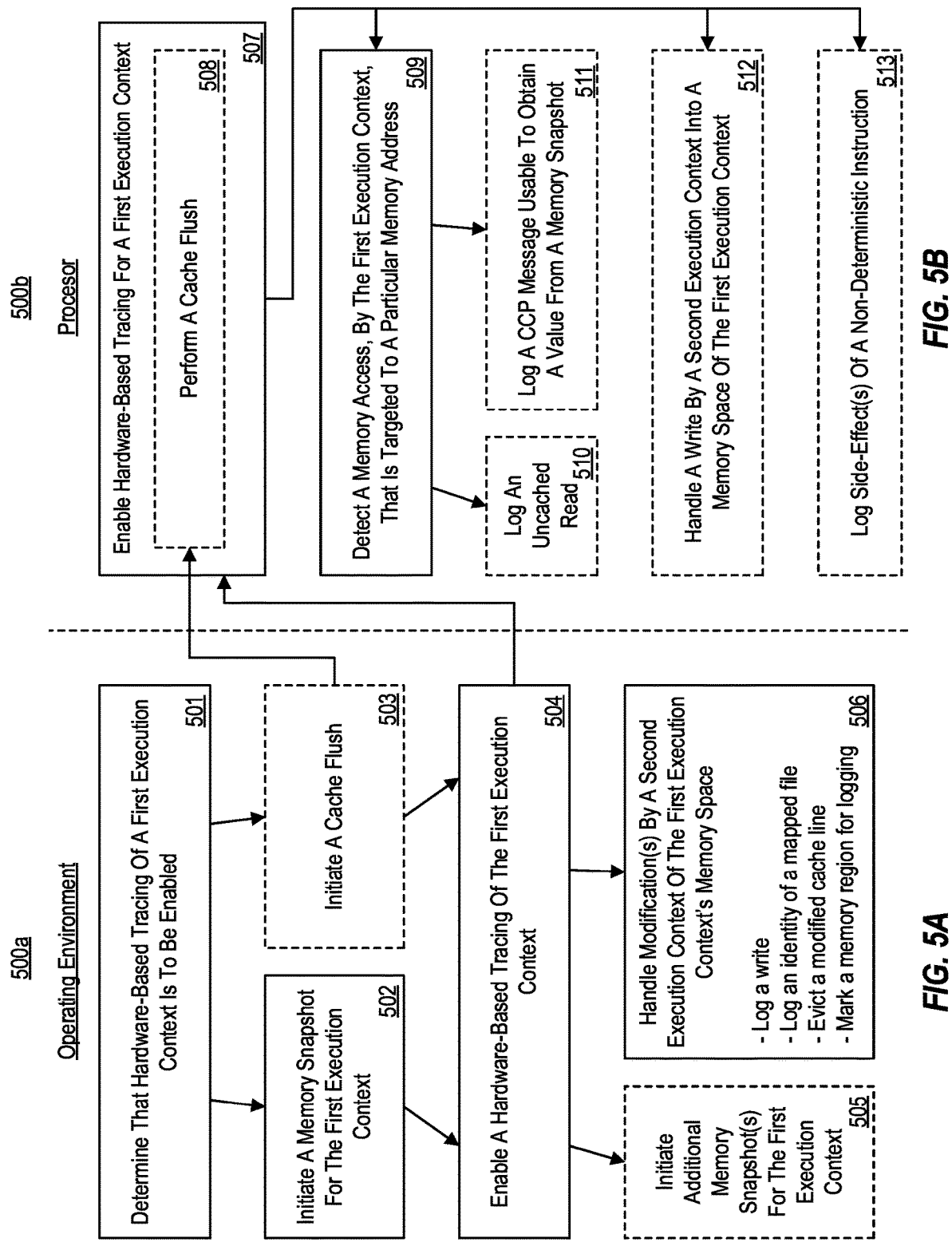
FIG. 5A illustrates a flow chart of an example method for a computer system to record a replayable execution trace based on recording CCP messages into a first trace, and on recording one or more memory snapshots into a second trace, the CCP messages being usable to obtain memory values from one or more memory snapshots.
FIG. 5B illustrates a flow chart of an example method for a processor to record one or more CCP messages into a first trace, the CCP messages being usable to obtain memory values from one or more memory snapshots stored within a second trace.

Further operation of the control logic 109 and operating environment 110 are now described in greater detail, primarily in connection with FIGS. 5A and 5B. FIG. 5A illustrates a flow chart of an example method 500a for a computer system to record a replayable execution trace based on recording CCP messages into a first trace, and on recording one or more memory snapshots into a second trace, the CCP messages being usable to obtain memory values from one or more memory snapshots. FIG. 5B illustrates a flow chart of an example method 500b for a processor to record one or more CCP messages into a first trace, the CCP messages being usable to obtain memory values from one or more memory snapshots stored within a second trace. The following discussion refers to a number of methods and method acts. Although the method acts may be discussed in a certain order, or may be illustrated in a flow chart as occurring in a particular order, no particular ordering is required unless specifically stated, or required because an act is specifically described as being dependent on another act being completed prior to the act being performed.

Referring to FIGS. 5A and 5B, method 500*a* includes acts 501-506 that are performed by an operating environment (e.g., hypervisor 110*a* and/or operating system 110*b*), while method 500*b* includes acts 507-513 that are performed by a processor (e.g., processor 102 based on control logic 109). As such, in some embodiments methods 500*a* and 500*b* are separate and distinct methods (i.e., one implemented and performed independently under direction of operating environment 110, and other implemented and performed independently under direction of control logic 109), while in other embodiments methods 500*a* and 500*b* are components of a single method that is performed by computer system 101 using cooperation between operating environment 110 and control logic 109.

Referring initially to operating environment 110, method 500*a* (e.g., performed by operation of the operating environment 110) includes an act of 501 of determining that hardware-based tracing of a first execution context is to be enabled. In some embodiments, act 501 comprises determining that tracing of execution, by the plurality processing units, of a first execution context is to be enabled. In an example, the tracer 118 determines that a context (e.g., process, operating system, virtual machine, enclave, hypervisor, etc.) that is configured for execution at the processor(s) 102 is to be traced during its execution, and that a hardware-assisted tracing of that execution context is therefore to be enabled at the processor(s) 102. In embodiments, this determination is based on some indication (e.g., in system memory 103, in durable storage 104, in a register 106*a*, etc.) that the execution context is assigned a tracing or logging state (which state has been assigned, for example, based on user input or based on a policy).

As shown, based at least on having performed act 501, method 500*a* proceeds to one or more of an act 502 initiating a memory snapshot for the first execution context, or an act 503 of initiating a cache flush. In FIG. 5A, acts 502 and 503 are illustrated as being potentially performed in parallel, though it will be appreciated that embodiments could alternatively perform these acts 502 and 503 serially (in either order).

In some embodiments, act 502 (i.e., of initiating a memory snapshot for the first execution context) comprises, based on determining that tracing of execution of the first execution context is to be enabled, initiating logging, into the second trace, of one or more memory snapshots of a memory space of the first execution context. In an example, the memory snapshot manager 118*b* initiates one or more snapshots of system memory 103 into component trace 112*b* (e.g., as one or more of memory snapshots 306). In some embodiments the memory snapshot manager 118*b* actually stores at least one memory snapshot into component trace 112*b* prior to method 500*a* proceeding to act 504. In other embodiments, the memory snapshot manager 118*b* only initiates a memory snapshotting process prior to method 500*a* proceeding to act 504 (e.g., by tracking which memory locations are accessed by the traced execution context). In an example of this latter embodiment, act 502 comprises initiating tracking of one or more memory regions (e.g., cache lines, memory pages, etc.) within the memory space of the first execution context that are accessed by at least one of the plurality of processing units. In embodiments, tracked memory regions are stored into a snapshot on-demand as they are read, or at a later time (e.g., when the processor 102 has available cycles, just prior to committing a write to a tracked memory region, etc.).

Whether memory snapshot manager 118*b* stores a memory snapshot, or merely initiates a memory snapshotting process, prior to method 500*a* proceeding to act 504, in various embodiments the memory snapshot manager 118*b* stores at least one full memory snapshot (e.g. all of system memory 103) or at least one partial memory snapshot (e.g. only a portion of system memory 103). Thus, in some embodiments of act 502 initiating logging of the one or more memory snapshots comprises initiating logging of at least one of a full memory snapshot or a partial memory snapshot. In embodiments, when act 502 initiates logging of a partial memory snapshot, that partial memory snapshot excludes a least one of (i) a paged-out memory page within the memory space of the first execution context (e.g., a memory page that is paged out to a swap file or swap partition on durable storage 104), or (ii) a memory page within the memory space of the first execution context that is not accessed by the first execution context (i.e., based on tracking which memory region(s) have been accessed by the first execution context).

In some embodiments, act 503 (i.e., of initiating a cache flush) comprises, based on determining that tracing of execution of the first execution context is to be enabled, initiating evicting or invalidating one or more cache lines that overlap with the memory space of the first execution context. In an example, prior the method 500*a* proceeding to act 504, the cache flush initiator 118*a* proactively instructs the processor 102 to evict or invalidate all, or a portion, of its cache(s) 107. As indicated by an arrow between acts 503 and 508, this causes the processor 102 to perform the eviction/invalidation (e.g., using cache flusher 116). In embodiments, the cache flush initiator 118*a* instructs the processor 102 to evict/invalidate only those cache lines that overlap with memory addresses within a memory space of the first execution context.

After one or both of acts 502 and 503, method 500*a* proceeds to act of 504 of enabling a hardware-based tracing of the first execution context. In some embodiments, act 504 comprises, based on determining that tracing of execution of the first execution context is to be enabled, enabling a hardware tracing feature of the processor. In an example, the processor trace enabler 118*c* communicates to trace enabler 115 that tracing of the first execution context should be enabled. As indicated by an arrow between acts 504 and 507, this causes the processor to enable hardware-based tracing for the first execution context. In some embodiments, enabling the hardware tracing feature of the processor causes the processor to log, into the first trace, one or more CCP messages generated in response to one or more memory access, by one or more of the plurality of processing units, into the memory space of the first execution context. These embodiments are described in greater detail in connection with method 500*b*.

As discussed previously, some embodiments of method 500*a* omit act 503 (i.e., of initiating a cache flush). In these embodiments, enabling the hardware-based tracing of the first execution context in act 504 triggers a cache flush instead. For example, as indicated by an arrow between acts 504 and 508, enabling the hardware-based tracing of the first execution context in act 504 causes the processor 102 to perform the eviction/invalidation (e.g., using cache flusher 116). Thus, in some embodiments of method 500*a*, enabling the hardware tracing feature of the processor also causes the processor to flush, from the cache, at least one cache line that overlaps with a memory space of the first execution context.

As shown, based at least on having performed act 504, method 500*a* proceeds to one or more of an act 505 of initiating additional memory snapshot(s) for the first execution context, or an act 503 of handling modification(s), by a second execution context, of the first execution context's memory space. In FIG. 5A, acts 505 and 506 are illustrated as being potentially performed in parallel, though it will be appreciated that embodiments could alternatively perform these acts 505 and 506 serially (in either order).

In some embodiments, act 505 (i.e., of initiating additional memory snapshot(s) for the first execution context) comprises, after enabling the hardware tracing feature of the processor, initiating one or more additional memory snapshots during tracing of the first execution context. In an example, the memory snapshot manager 118*b* initiates and stores, into memory snapshots 306, occasional memory snapshots during execution of the first context. In some embodiments, an additional memory snapshot is an independent memory snapshot (whether full or partial). In other embodiments, an additional memory snapshot is a differential memory snapshot that is dependent on one or more prior memory snapshots (e.g., in the form of a diffgram that describes how to transform a prior memory snapshot into subsequent memory snapshot). As will be appreciated, these additional memory snapshots are usable to initiate replay at various points in a trace recording.

In some embodiments, act 506 (i.e., of handling modification(s), by a second execution context, of the first execution context's memory space) comprises, after enabling the hardware tracing feature of the processor, handling a write by a second execution context. In an example, the first (i.e., traced) execution context executes concurrently, or sequentially, with a second execution context (e.g., an operating system kernel), and that second execution context writes into the memory space of the first execution context. Thus, the external activity handler 118*d* takes one or more actions to log or otherwise account for this write. In embodiments, act 506 comprises the external activity handler 118*d* performing one or more of the following in connection with execution of the second execution context: (i) logging, into one or more of the first trace or the second trace, a write by the second execution context into the memory space of the first execution context; (ii) logging, into the second trace, an identity of a file mapped by the second execution context into the memory space of the first execution context; (iii) based at least on the second execution context writing to a cache line in the cache that overlaps with a memory location in memory space of the first execution context, evicting, or marking as invalid, the cache line from the cache; or (iv) based at least on the second execution context writing to a memory region within the memory space of the first execution context, marking the memory region as needing to be logged in connection with execution of the first execution context. In some embodiments, plural external execution contexts write into the memory space of the first execution context. In these embodiments, the term "second execution context" refers to these plural external contexts.

In some embodiments, the external activity handler 118*d* logs, into one or more of the first trace or the second trace, the write by the second execution context into the memory space of the first execution context. In one example, the external activity handler 118*d* logs the write by invoking the memory snapshot manager 118*b* to create one or more snapshots within component trace 112*b* (e.g., memory snapshot(s) 306) capturing any memory location(s) that were modified by the write. In another example, the external activity handler 118*d* logs the write into a data stream of component trace 112*b* (e.g., data stream 307). In some embodiments, logging the write by the second execution context comprises logging a result of a DMA operation (e.g., processed by an operating kernel on behalf of a hardware device) into the second trace.

In some embodiments, the external activity handler 118*d* logs, into the second trace, the identity of the file mapped by the second execution context into the memory space of the first execution context. In one example, the write into the memory space of the first execution context contains the contents of a file (e.g., an application binary, a data file, etc.) that can be accessed during replay. Thus, rather than recording the data of the file itself (e.g., as one or more writes) into component trace 112*b*, the external activity handler 118*d* logs information identifying the file into component trace 112*b* (e.g. reference to one or more of a file name, a file identifier, a hash, a checksum, etc.).

In some embodiments, based at least on the second execution context writing to the cache line in the cache that overlaps with the memory location in memory space of the first execution context, the external activity handler 118*d* evicts, or marks as invalid, the cache line from the cache. In an example, the external activity handler 118*d* instructs the cache flusher 116 to evict or invalidate any written-to cache lines from the cache(s) 107 and into system memory 103. By doing so, if the first execution context later accesses a memory address that overlapped with the evicted/invalidated cache line, the CCP logger 117*b* records appropriate CCP messages relating to a cache miss for the access. In some embodiments, the external activity handler 118*d* also invokes the memory snapshot manager 118*b* to snapshot (e.g., into component trace 112*b*) at least a portion of system memory 103 corresponding to the evicted data and/or logs the write (e.g., into component trace 112*b*).

In some embodiments, based at least on the second execution context writing to the memory region within the memory space of the first execution context, the external activity handler 118*d* marks the memory region as needing to be logged in connection with execution of the first execution context. In an example, the external activity handler 118*d* delays logging to a time at which the write is actually consumed by marking a memory page corresponding to the write (e.g., via a PTE or PDE, within a data structure stored in system memory 103, etc.) as needing to be logged later (e.g., if it is later accessed by the first execution context). In doing so, the external activity handler 118*d* reduces logging overheads imposed on the second execution context, and may avoid logging the write altogether (e.g., if the first execution context never accesses the marked memory page later). In embodiments, logging of the marked memory page is triggered by the external activity handler 117*e* within control logic 109 if the first execution context later accesses the marked memory page. In some embodiments a subsequent access to a marked memory page is logged into the component trace 112*b* by initiating a trap to tracer 118. In embodiments, the tracer 118 performs this logging by using the memory snapshot manager 118*b* to store a memory snapshot (full or differential) into component trace 112*b*. Thus, in embodiments, in connection with a subsequent execution of the first execution context, the computer system logs, into the second trace, at least a portion of the memory region. In other embodiments a subsequent access to a marked memory page is logged into the component trace 112*a* based on the uncached read logger 117*c* as logging the read as an uncached read. Thus, in embodiments, in connection with a subsequent execution of the first execution context, the computer system logs, into the first trace, at least a portion of the memory region as an uncached read.

In some embodiments, the external activity handler 118*d* always logs a detected write, or always delays the logging, while in other embodiments the external activity handler 118*d* includes logic for making a decision as to whether to log a write or to delay the logging. In various embodiments, this logic operates based on how much data was written, the nature of an application programming interface (API) generating the writes, attribute(s) of the target memory region of the write (e.g., based on the target memory region, such as stack or heap), etc. In one example, some operating system kernels share one or more memory pages with a user mode process. In this example, the external activity handler 118*d* delays logging of a write by the kernel to this shared memory page until it is consumed by the user mode process. In a further example, this shared memory page is read-only for user mode, so any changes to this shared page are known to be made by the kernel. Thus, in this further example the external activity handler 118*d* logs only those reads by the user mode process that are directed to memory addresses that were changed by the kernel, and refrains from logging reads from other memory addresses within the shared memory page. In yet another example, the external activity handler 118*d* immediately logs a return value that is written into the user mode process's memory space by some kernel calls.

As mentioned, in some embodiments component traces 112*a* and 112*b* are stored using different security protections. Thus, in some embodiments, method 500*a* includes an act of encrypting the second trace (e.g., component trace 112*b*). As will be appreciated in view of the foregoing disclosure, the second trace primarily comprises "bulk data," such as in the form of memory snapshots, that may contain sensitive memory values. Thus, in some embodiments the trace encryptor 118*e* encrypts the second trace to apply a cryptographic security protection to those sensitive memory values. In some embodiments, the trace encryptor 118*e* encrypts the second trace "on the fly" during creation of the second trace, while in other embodiments the trace encryptor 118*e* encrypts the second trace after creation of the second trace.

Turning now to FIG. 5B, method 500*b* is performed based at least on operation of control logic 109 at a processor 102 that includes a plurality of processing units 106 and a cache 107. As shown, method 500*b* includes an act of 507 of enabling hardware-based tracing for a first execution context. In some embodiments, act 507 comprises, based on an instruction from an operating environment, enabling a hardware tracing feature of a processor, including enabling tracing of an execution context. In an example, based on an instruction received from the processor trace enabler 118*c* in act 504, the trace enabler 115 enables tracing for the first execution context discussed in connection with method 500*a*.

Method 500*b* also includes an act 508 of performing a cache flush. In some embodiments, act 508 comprises flushing, from the cache, at least one cache line that overlaps with a memory space of the execution context in connection with enabling trace recording for the execution context. In an example, the cache flusher 116 flushes all of cache(s) 107, or flushes an identified portion of cache(s) 107 corresponding to memory space of the first execution context. As discussed in connection with acts 503 and 504, in various embodiments act 508 is performed based on an express instruction from the cache flush initiator 118*a* (i.e., act 503), or based on an instruction from the processor trace enabler 118*c* to enable tracing features (i.e., act 504). Thus, while act 508 is shown as being part of act 507, in some embodiments act 508 is performed separately from, and prior to, act 507 (and, thus, act 508 is shown in broken lines).

After acts 507 and 508, method 500*b* proceeds to one or more of an act 509 of detecting a memory access, by the first execution context, that is targeted to a particular memory address; an act 512 of handing a write by a second execution context into a memory space of the first execution context; or an act 513 of logging side-effect(s) of a non-deterministic instruction. The particular act(s) to which method 500*b* proceeds depends on the nature of the instruction(s) executed by the traced execution context.

In some embodiments, act 509 (i.e., of detecting a memory access, by the first execution context, that is targeted to a particular memory address) comprises detecting a memory access by a first processing unit of the plurality of processing units, the memory access being targeted at a particular memory address during execution of an execution context. In an example, the memory access detector 117*a* detects when a machine code instruction of the first execution context accesses a location in system memory 103. The particular memory address to which the memory access is targeted may be one that is configured to be cached by the cache(s) 107, or one that is not configured to be cached by the cache(s) 107.

Based on the nature of the memory access, after act 509 some embodiments of method 500*b* proceed to act 510 of logging an uncached read, or an act 511 of logging a CCP message usable to obtain a value from a memory snapshot. In embodiments, method 500*b* proceeds to act 510 if the memory access is a read targeted to a memory address that is not configured to be cached by the cache(s) 107, and proceeds to act 511 if the memory access is a read targeted to a memory address that is configured to be cached by the cache(s) 107.

In some embodiments, act 510 (i.e., of logging an uncached read) comprises determining that the memory access is a read that is targeted to an uncached memory location and, based on the memory access being the read that is targeted to the uncached memory location, logging at least a value read by the memory access. In an example, the memory access detector 117*a* detects that the memory access is an uncached read, and thus invokes the uncached read logger 117*c*. The uncached read logger 117*c*, in turn, logs the uncached read into component trace 112*a*. As discussed previously, in embodiments the uncached read logger 117*c* logs one or both of the target memory address of the memory access or a value that was read by the uncached memory access. When logging a value read by the uncached memory access, some embodiments of the uncached read logger 117*c* encrypt the value within component trace 112*a*, such as by encrypting a data packet 304, or portion thereof, or by storing the value within an encrypted data stream within the component trace 112*a*. Thus, in some embodiments of act 510, the first trace comprises a first trace data stream, and logging the value read by the second memory access comprises at least one of (i) logging the value into an encrypted second trace data stream, or encrypting the value within the first trace data stream.

In some embodiments, act 511 (i.e., of logging a CCP message usable to obtain a value from a memory snapshot) comprises, based on detecting the memory access, logging, into the first trace, information usable to obtain a memory value corresponding to the particular memory address from the one or more memory snapshots stored within the second trace. In an example, the CCP logger 117b logs, into component trace 112a, one or more indicia of CCP activity that resulted from processing the detected memory access via the cache(s) 107. In embodiments, act 512 comprises logging the particular memory address and at least one of (i) a first CCP message indicating that none of the plurality of processing units possessed a first cache line within the cache that overlaps with the particular memory address; (ii) a second CCP message indicating that the first processing unit initiated a cache miss for the particular memory address; or (iii) a third CCP message indicating that the first processing unit obtained, from a second processing unit of the plurality of processing units, a second cache line within the cache that overlaps with the particular memory address. Examples of these CCP messages were provided in connection with FIGS. 4A-4C.

In some embodiments, the CCP logger 117b causes the processor to log the first CCP message indicating that none of the plurality of processing units possessed the first cache line within the cache that overlaps with the particular memory address. For instance, FIG. 4A provided an example 400a in which processing unit 401a initiated a cache miss on memory location 403a after concluding that no other processing unit had a cached copy of memory location 403a, and FIG. 4C provided an example 400c in which processing unit 401c initiated a cache miss on memory location 403a after concluding that no other processing unit had a cached copy of memory location 403a. In both examples 400a and 400c, the CCP logger 117b logged one or more CCP messages into component trace 112a providing one or more indicia of the processing unit 401a/401c having obtained memory location 403a from system memory 403, such as one or more CCP messages indicating that no other processing unit had a copy of memory location 403a, and/or some other ordering information such as a timestamp, an instruction count, and the like.

In some embodiments, the CCP logger 117b causes the processor to log the second CCP message indicating that the first processing unit initiated the cache miss for the particular memory address. For instance, FIG. 4A provided an example 400a in which processing unit 401a initiated a cache miss on memory location 403a after concluding that no other processing unit had a cached copy of memory location 403a, and FIG. 4C provided an example 400c in which processing unit 401c initiated a cache miss on memory location 403a after concluding that no other processing unit had a cached copy of memory location 403a. In both examples 400a and 400c, the CCP logger 117b logged one or more CCP messages into component trace 112a providing one or more indicia of the processing unit 401a/401c having obtained memory location 403a from system memory 403, such as or one or more CCP messages indicating that the processing unit 401a/401c initiated a cache miss on an address of memory location 403a.

In some embodiments, the CCP logger 117b causes the processor to log the third CCP message indicating that the first processing unit obtained, from the second processing unit, the second cache line within the cache that overlaps with the particular memory address. For instance, FIG. 4B provided an example 400b in which processing unit 401b obtained a cached copy of memory location 403a from processing unit 401a. In example 400b, the CCP logger 117b logged one or more CCP messages into component trace 112a providing one or more indicia of processing unit 401b having obtained memory location 403a from processing unit 401a, such a copy of the CCP message processing unit 401a sent to processing unit 401b.

In some embodiments, the CCP logger 117b causes the processor to log, into the first trace, one or more CCP messages indicating that one or more of the plurality of processing units caused one or more evictions from the cache. For instance, FIG. 4C provided an example 400c in which processing units 401a and/or 401b evicted their copies of memory location 403a back to system memory 403. In example 400b, embodiments of the CCP logger 117b logged one or more CCP messages into component trace 112a providing one or more indicia of these eviction(s).

In some embodiments, the execution context comprises a first execution context, and a second execution context initiates a write into a memory space of the first execution context. In these embodiments, act 512 (i.e., of handing a write by a second execution context into a memory space of the first execution context) comprises the external activity handler 117e performing at least one of the following to handle the write: (i) logging at least one of a memory address or a value of the write, (ii) evicting a cache line overlapping with the memory address of the write, (iii) marking a memory page corresponding to the memory address of the write as needing to be logged, or (iv) initiating a trap handler that logs the memory page corresponding to the memory address.

In some embodiments, the external activity handler 117e logs at least one of the memory address or the value of the write. In one example, the external activity handler 117e logs the write into a data stream of component trace 112a. In embodiments, when logging the write into a data stream of component trace 112a, the first trace comprises a first trace data stream, and logging the value of the write comprises at least one of (i) logging the value of the write into an encrypted second trace data stream, or encrypting the value of the write within the first trace data stream. In another example, the external activity handler 117e coordinates with external activity handler 118d to log the write by invoking the memory snapshot manager 118b to create one or more snapshots within component trace 112b capturing any memory location(s) that were modified by the write.

In some embodiments, the external activity handler 117e evicts, or marks as invalid, the cache line overlapping with the memory address of the write. In an example, the external activity handler 117e instructs the cache flusher 116 to evict or invalidate any written-to cache lines from the cache(s) 107 and into system memory 103. By doing so, if the first execution context later accesses a memory address that overlapped with the evicted/invalidated cache line, the CCP logger 117b records appropriate CCP messages relating to the access. In some embodiments, the external activity handler 117e also coordinates with external activity handler 118d to invoke the memory snapshot manager 118b to snapshot (e.g., into component trace 112b) at least a portion of system memory 103 corresponding to the evicted data and/or logs the write (e.g., into component trace 112b).

In some embodiments, the external activity handler 117e marks the memory page corresponding to the memory address of the write as needing to be logged. In an example, the external activity handler 117e coordinates with the external activity handler 118d to mark a memory page corresponding to the write (e.g., via a PTE or PDE, within a data structure stored in system memory 103, etc.) as needing to be logged later (e.g., if it is later accessed by the first execution context).

In some embodiments, the external activity handler 118*d* initiates the trap handler that logs the memory page corresponding to the memory address. In an example, the external activity handler 117*e* triggers an interrupt that causes the tracer 118 to execute a trap handler that logs the memory page corresponding to the memory address into component trace 112*b*.

In some embodiments, act 513 (i.e., of logging side-effect(s) of a non-deterministic instruction) comprises logging, into the first trace, a side-effect of execution of at least one non-deterministic processor instruction of the execution context. In an example, the nondeterministic instruction logger 117*d* detects execution of a nondeterministic instruction by the first execution, and logs, into component trace 112*a*, the side-effects of that instruction's execution. In some embodiments, those side effects are logged by recording the value(s) of one or more of registers 106*a*.

In embodiments, the first trace (e.g., component trace 112*a*, recorded primarily by tracer 117 during operation of method 500*b*) and the second trace (e.g., component trace 112*b*, recorded primary by tracer 118 during operation of method 500*a*) are combinable to replay execution of the first execution context. In some embodiments, the first trace and the second trace are combinable based, at least in part on, comparing first timestamps and/or counts that provide at least a partial ordering of events within the first trace with second timestamps and/or counts that provide at least a partial ordering of events within the second trace.

In embodiments, the first trace and the second trace are combinable to replay execution of the first execution context based on using the one or more CCP messages logged into the first trace to identify a memory value logged into the one or more memory snapshots within the second trace and that was consumed by at least one of the plurality processing units. For example, as discussed in connection with FIGS. 4A-4C, the memory accesses in examples 400*a*-400*c* are reproducible based on an initial memory snapshot of system memory 403 (e.g., within component trace 112*b*), and based at least on the CCP messages logged by the CCP logger 117*b* (within component trace 112*a*). For example, a CCP message in component trace 112*a* is usable to identify a memory address (potentially with an execution time range when the memory address was requested), and this memory address is then usable to determine a value from component trace 112*b* (e.g., within a memory snapshot 306).

In embodiments, the first trace and the second trace are combinable to replay execution of the first execution context based on using the one or more CCP messages logged into the first trace to identify a memory value that was consumed by a first of the plurality processing units which was previously written by a second of the plurality processing units. For example, as discussed in connection with FIGS. 4B, in example 400*b* processing unit 401*b* obtains a cached copy of memory location 403*a* from processing unit 401*a* (which had previously written to its cache copy of memory location 403*a*), and the CCP logger 117*b* logs CCP message(s) into component trace 112*a* providing indicia of processing unit 401*b* having obtained memory location 403*a* from processing unit 401*a*. Thus, these CCP message(s) are usable to reproduce this activity (e.g., based on the ordering logged CCP messages, which ordering is, in some embodiments, identified based on timestamps and/or counts associated those messages, based on an inherent ordering of CCP messages etc.).

In embodiments, tracer 117 operates only when logging is enabled for a processor 102 generally and/or when logging is enabled for the context that is currently executing. Thus, in some embodiments, the processor determines that logging is enabled for at least one of the processor or the execution context, and the processor logs the information usable to obtain the memory value corresponding to the particular memory address from the one or more memory snapshots stored within the second trace based at least on logging being enabled for at least one of the processor or the execution context.

In some embodiments, the tracer 117 determines if a memory region associated with a target memory address of a memory access has been tagged to be logged or to be not logged (e.g., via one or more flags in a PTE or PDE, via mappings stored in data structure stored in system memory 103, via mappings stored in a register 106*a*, etc.), and the tracer 117 refrains from logging the memory access if the memory region associated with the target memory address is tagged to be not logged. Thus, in some embodiments, method 500*b* includes determining whether logging is enabled for a memory region corresponding to the particular memory address, and determining whether to log the information usable to obtain the memory value corresponding to the particular memory address from the one or more memory snapshots stored within the second trace based at least on whether logging is enabled for the memory region.

In some embodiments, the CCP logger 117*b* refrains from logging CCP messages for a memory access, or the uncached read logger 117*c* avoid logging a memory access, if a target memory address of the access that has been marked as being otherwise reconstructable or predictable (e.g., via access to a memory-mapped file, via access to a stored memory snapshot, via emulation of a memory-mapped hardware device, via reproduction of a well-known behavior, by combining available data in known ways, etc.). Thus, in some embodiments, the memory access detector 117*a* determines that the memory access is targeted to a read-only memory location and, based at least on the memory access being targeted to a read-only memory location, CCP logger 117*b* refrains from logging a CCP message for the memory access, or the uncached read logger 117*c* refrains from logging an uncached read for the memory access.

As noted, a processor 102 forms a quasi-closed system with its caches 107, so replay of the execution traces 112 described herein (i.e., which include component traces 112*a* and 112*b*) can be accomplished by reconstructing the data influxed into those caches 107 (plus the non-deterministic instructions, uncached reads, etc.) from an execution trace 112. The CCP data in component trace 112*a* provides information about when data was influxed into the caches 107 via a cache miss, while the data that was influxed by the cache miss can be obtained from the memory snapshots in component trace 112*b* and/or from replay of the execution trace 112 up to point of the cache miss.

Accordingly, at least some embodiments described herein separate an execution trace into component traces. In embodiments, separating an execution trace into component traces facilitates data separation and the ability to store the component traces into different security domains, with different data security policies, with different protections, etc. This protects sensitive memory values, such as PII, encryption keys, and the like, while providing many of the same opportunities to reduce recording overheads and/or to reduce the amount of data that is recorded into an execution trace as more conventional cache-based recording techniques. In embodiments, separating an execution trace into component traces facilitates also results in reduced memory bandwidth use when compared to more conventional cache-based recording techniques. In particular, at least some embodiments described herein record at least a portion of CCP messages communicated between a plurality of processing units as those processing units perform memory access for an execution context into a first component trace, and record one or more snapshots of at least a portion of system memory into a second component trace. While the first component trace contains sufficient information to be useful for profiling and/or debugging the execution context (such as to analyze processor cache use by the execution context), first component trace lacks sufficient information to actually replay the recorded execution of the execution context. Nonetheless, replay of the recorded execution of the execution context can be accomplished by combining the information contained in the first component trace with the information contained in the second component trace.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A processor configured to participate in recording a replayable execution trace based on recording one or more cache coherency protocol (CCP) messages into a first trace, the CCP messages being usable to obtain memory values from one or more memory snapshots stored within a second trace, the processor comprising:
   a plurality of processing units;
   a cache; and
   control logic that causes the processor to at least:
      detect a memory access by a first processing unit of the plurality of processing units, the memory access being targeted at a particular memory address during execution of an execution context; and
      based on detecting the memory access,
         determine that logging is enabled for a memory region corresponding to the particular memory address;
         based on logging being enabled for the memory region, determine to log information usable to obtain a memory value corresponding to the particular memory address from the one or more memory snapshots stored within the second trace; and
         log, into the first trace, the information usable to obtain the memory value corresponding to the particular memory address from the one or more memory snapshots stored within the second trace, including logging the particular memory address and at least one of:
            a first CCP message indicating that none of the plurality of processing units possessed a first cache line within the cache that overlaps with the particular memory address;
            a second CCP message indicating that the first processing unit initiated a cache miss for the particular memory address; or
            a third CCP message indicating that the first processing unit obtained, from a second processing unit of the plurality of processing units, a second cache line within the cache that overlaps with the particular memory address.

2. The processor of claim 1, wherein the control logic causes the processor to log the first CCP message indicating that none of the plurality of processing units possessed the first cache line within the cache that overlaps with the particular memory address.

3. The processor of claim 1, wherein the control logic causes the processor to log the second CCP message indicating that the first processing unit initiated the cache miss for the particular memory address.

4. The processor of claim 1, wherein the control logic causes the processor to log the third CCP message indicating that the first processing unit obtained, from the second processing unit, the second cache line within the cache that overlaps with the particular memory address.

5. The processor of claim 1, wherein the control logic also causes the processor to log, into the first trace, one or more CCP messages indicating that one or more of the plurality of processing units caused one or more evictions from the cache.

6. The processor of claim 1, wherein the memory access comprises a first memory access, and wherein the control logic also causes the processor to:
   detect a second memory access during execution of the execution context;
   determine that the second memory access is a read that is targeted to an uncached memory location; and
   based on the second memory access being the read that is targeted to the uncached memory location, log at least a value read by the second memory access.

7. The processor of claim 6, wherein the first trace comprises a first trace data stream, and wherein logging the value read by the second memory access comprises at least one of (i) logging the value into an encrypted second trace data stream, or encrypting the value within the first trace data stream.

8. The processor of claim 1, wherein the control logic also causes the processor to log, into the first trace, a side-effect of execution of at least one non-deterministic processor instruction of the execution context.

9. The processor of claim 1, wherein the control logic also causes the processor to determine that logging is enabled for the execution context, and wherein the processor logs the information usable to obtain the memory value corresponding to the particular memory address from the one or more memory snapshots stored within the second trace based at least on logging being enabled for the execution context.

10. The processor of claim 1, wherein the execution context comprises a first execution context, and wherein, based at least on a second execution context initiating a write into a memory space of the first execution context, the control logic also causes the processor to perform at least one of:

log at least one of a memory address or a value of the write;
evict a cache line overlapping with the memory address of the write;
mark a memory page corresponding to the memory address of the write as needing to be logged; or
initiate a trap handler that logs the memory page corresponding to the memory address.

11. The processor of claim 10, wherein the control logic causes the processor to log the value of the write, wherein the first trace comprises a first trace data stream, and wherein logging the value of the write comprises at least one of (i) logging the value of the write into an encrypted second trace data stream, or encrypting the value of the write within the first trace data stream.

12. The processor of claim 1, wherein the control logic also causes the processor to enable trace recording for the execution context.

13. The processor of claim 12, wherein the control logic also causes the processor to flush, from the cache, at least one cache line that overlaps with a memory space of the execution context in connection with enabling trace recording for the execution context.

14. The processor of claim 1, wherein the memory access comprises a first memory access, and wherein the control logic also causes the processor to:
detect a third memory access during execution of the execution context;
determine that the third memory access is targeted to a read-only memory location; and
based on the third memory access being targeted to a read-only memory location, refrain from logging a CCP message or an uncached read for the third memory access.

15. The processor of claim 1, wherein,
determining that logging is enabled for the memory region comprises determining that the memory region associated is tagged to be logged; and
determining that the memory region associated is tagged to be logged comprises identifying one or more of a flag in a page table entry or a page directory entry, a mapping stored in a data structure in a system memory, or a mapping stored in a register of the processor.

16. A method, implemented at a processor that includes a plurality of processing units and a cache, for participating in recording a replayable execution trace based on recording one or more cache coherency protocol (CCP) messages into a first trace, the CCP messages being usable to obtain memory values from one or more memory snapshots stored within a second trace, the method comprising:
detecting a memory access by a first processing unit of the plurality of processing units, the memory access being targeted at a particular memory address during execution of an execution context; and
based on detecting the memory access,
determining that logging is enabled for a memory region corresponding to the particular memory address;
based on logging being enabled for the memory region, determining to log information usable to obtain a memory value corresponding to the particular memory address from the one or more memory snapshots stored within the second trace; and
logging, into the first trace, the information usable to obtain the memory value corresponding to the particular memory address from the one or more memory snapshots stored within the second trace, including logging the particular memory address and at least one of:
a first CCP message indicating that none of the plurality of processing units possessed a first cache line within the cache that overlaps with the particular memory address;
a second CCP message indicating that the first processing unit initiated a cache miss for the particular memory address; or
a third CCP message indicating that the first processing unit obtained, from a second processing unit of the plurality of processing units, a second cache line within the cache that overlaps with the particular memory address.

17. The method of claim 16, wherein the method comprises logging the first CCP message indicating that none of the plurality of processing units possessed the first cache line within the cache that overlaps with the particular memory address.

18. The method of claim 16, wherein the method comprises logging the second CCP message indicating that the first processing unit initiated the cache miss for the particular memory address.

19. The method of claim 16, wherein the method comprises logging the third CCP message indicating that the first processing unit obtained, from the second processing unit, the second cache line within the cache that overlaps with the particular memory address.

20. The method of claim 16, further comprising logging, into the first trace, one or more CCP messages indicating that one or more of the plurality of processing units caused one or more evictions from the cache.

* * * * *